United States Patent
Shinohara et al.

(10) Patent No.: US 10,875,341 B2
(45) Date of Patent: Dec. 29, 2020

(54) PRINTING APPARATUS AND PRINTING METHOD

(71) Applicant: MIMAKI ENGINEERING CO., LTD., Nagano (JP)

(72) Inventors: Masanobu Shinohara, Nagano (JP); Takashi Namiki, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 16/186,610

(22) Filed: Nov. 12, 2018

(65) Prior Publication Data

US 2019/0152247 A1 May 23, 2019

(30) Foreign Application Priority Data

Nov. 17, 2017 (JP) .................. 2017-221608

(51) Int. Cl.
*B41M 5/00* (2006.01)
*B41J 2/21* (2006.01)
(Continued)

(52) U.S. Cl.
CPC ............ *B41M 5/0023* (2013.01); *B41J 2/211* (2013.01); *B41J 11/002* (2013.01);
(Continued)

(58) Field of Classification Search
CPC .......... B65H 23/26; B65H 2404/14211; B41J 3/4078; B41J 11/002; B41J 29/377; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60;
(Continued)

(56) References Cited

U.S. PATENT DOCUMENTS

2008/0024541 A1* 1/2008 Hirato ............... B41J 2/155
347/19
2008/0173213 A1* 7/2008 Watanabe ............ B41C 1/1066
106/31.6
(Continued)

FOREIGN PATENT DOCUMENTS

WO 2017135425 8/2017

OTHER PUBLICATIONS

"Search Report of Europe Counterpart Application", dated May 16, 2019, p. 1-p. 8.

*Primary Examiner* — Manish S Shah
(74) *Attorney, Agent, or Firm* — JCIPRNET

(57) ABSTRACT

A printing apparatus is provided that effectively prevents the risk of ink bleeding so as to obtain a high-quality print result. The printing apparatus includes an inkjet head that ejects droplets of ink using inkjet technique so as to adhere the ink to the medium, and an ultraviolet light source that radiates ultraviolet light. The ink contains a colorant, an ultraviolet absorbent, a resin, and an aqueous solvent that emulsifies or suspends the resin. The ultraviolet light source irradiates the ink adhered to the medium with ultraviolet light to heat the ink to a temperature lower than a boiling point of the ink and high enough to prevent the ink from bleeding, so that the aqueous solvent is at least in part volatilized and removed from the ink.

14 Claims, 7 Drawing Sheets

(51) Int. Cl.
  *B41J 11/00*   (2006.01)
  *D06P 1/651*   (2006.01)
  *B41M 7/00*    (2006.01)
  *D06P 5/20*    (2006.01)
  *C09D 11/32*   (2014.01)
  *D06P 5/30*    (2006.01)
  *D06P 1/44*    (2006.01)
  *D06P 1/642*   (2006.01)
  *C09D 11/10*   (2014.01)
  *C09D 11/38*   (2014.01)
  *D06P 1/673*   (2006.01)

(52) U.S. Cl.
  CPC .......... *B41M 7/0081* (2013.01); *C09D 11/10* (2013.01); *C09D 11/32* (2013.01); *C09D 11/38* (2013.01); *D06P 1/44* (2013.01); *D06P 1/6426* (2013.01); *D06P 1/65112* (2013.01); *D06P 1/65125* (2013.01); *D06P 1/673* (2013.01); *D06P 5/2005* (2013.01); *D06P 5/30* (2013.01); *B41M 7/009* (2013.01)

(58) Field of Classification Search
  CPC ............. B41J 2002/012; B41J 2/04598; B41J 2/04588; B41J 2/04595; B41J 2/04586; B41J 2/14274; B41J 11/0015; B41J 2/161; B41J 2/1623; B41J 2202/00; B41J 2202/03; B41J 2/14201; B41J 2/045; B41M 5/0047; B41M 5/0011; B41M 5/0017; B41M 7/00; B41M 7/0072; B41M 5/52; B41M 5/5218; D06P 5/001; D06B 19/0076; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
  See application file for complete search history.

(56) References Cited

U.S. PATENT DOCUMENTS

| | | | |
|---|---|---|---|
| 2008/0192100 A1* | 8/2008 | Nakajima | B41J 2/2107 347/102 |
| 2008/0225100 A1* | 9/2008 | Kumagai | B41J 11/002 347/102 |
| 2009/0117266 A1* | 5/2009 | Kimura | C09B 47/045 427/160 |
| 2010/0247873 A1* | 9/2010 | Yokoi | C09D 11/101 428/195.1 |
| 2013/0016156 A1* | 1/2013 | Ooishi | C09D 11/322 347/21 |
| 2015/0022601 A1* | 1/2015 | Ohnishi | B41J 11/002 347/102 |
| 2018/0370253 A1* | 12/2018 | Ohnishi | B41J 11/002 |

* cited by examiner

Calculation of thermal time constant in polyvinyl chloride sheet

■ Physical properties of polyvinyl chloride sheet

| Physical properties | Value | Unit | Value used in calculation |
|---|---|---|---|
| Density | $1.36 \times 10^3 \sim 1.54 \times 10^3$ | $[kg/m^3]$ | $1.45 \times 10^3$ |
| Specific heat | $1.05 \times 10^3 \sim 1.22 \times 10^3$ | $[J \cdot kg^{-1} \cdot K^{-1}]$ | $1.14 \times 10^3$ |
| Thermal conductivity | $0.15 \sim 0.21$ | $[J \cdot s^{-1} \cdot m^{-1} \cdot K^{-1}]$ | $0.18$ |

$$\tau = mc\frac{1}{\lambda}$$

$$= \rho c \frac{1}{\lambda}$$

$$= 1.45 \times 10^3 \times 10^{-3} \times 1.14 \times 10^3 \times \frac{10^{-3}}{0.18}$$

$$\approx 9.18 \ [s]$$

$\tau$: thermal time constant $[s]$
$\lambda$: thermal conductivity $[J \cdot s^{-1} \cdot m^{-1} \cdot K^{-1}]$
$\rho$: density $[kg/m^3]$
$c$: specific heat $[J \cdot kg^{-1} \cdot K^{-1}]$
$m$: mass $[kg]$

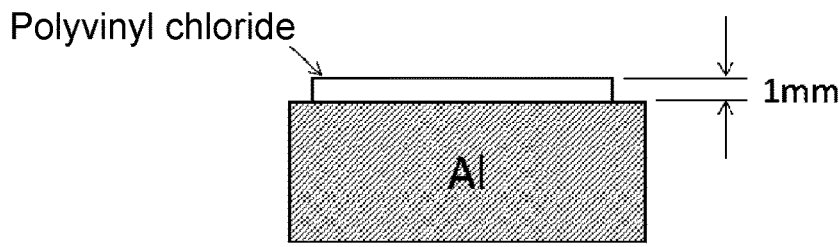

FIG. 4

PRINTING APPARATUS AND PRINTING METHOD

CROSS REFERENCE TO RELATED APPLICATIONS

This application claims the priority benefit of Japanese Patent Application No. 2017-221608, filed on Nov. 17, 2017. The entirety of the above-mentioned patent application is hereby incorporated by reference herein and made a part of this specification.

TECHNICAL FIELD

This disclosure relates to a printing apparatus and a printing method.

DESCRIPTION OF THE BACKGROUND ART

Conventionally, inkjet printers that perform inkjet printing are used for various purposes (for example, see Internet URL http://www.mimaki.co.jp). Inks often used in the inkjet printers may include evaporation-drying inks, for example, aqueous inks including aqueous pigment inks, latex inks, and inks in which pigment-encapsulated resin particles are dispersed, and organic solvent-containing solvent inks. The evaporation-drying ink refers to ink dried and fixable to a print medium by evaporating a solvent included in the ink. In the latex ink, among the mentioned examples, a colorant is, instead of being dissolved in an organic solvent, dispersed in an aqueous solvent, such as water, with resin. Such latex ink may be an eco-friendly material that does not emit unpleasant odor or contaminate environment because of less volatile organic compounds discharged by volatilizing the solvent.

In the inkjet printer using the evaporation-drying ink, for example, an aqueous ink, the ink is heated and dried by a heater and is thereby prevented from bleeding and fixed to a medium. In a specific known method, for example, the medium is heated by a heater (printing heater) not to bleed, and the ink is then dried and fixed by a heating means (after-heater) such as various heaters and infrared lamps. In another specific known method, for example, a conventional means to prevent the ink bleeding is to form an ink receiving layer on a print target medium.

SUMMARY

If this means is employed, however, particular print mediums having such an ink receiving layer previously formed thereon can only be used for printing. Further, the ink solvent may remain in the ink receiving layer, which may lead to other issues. When a medium is used that needs to be rolled up after the printing, for example, ink may be likely to bleed through to the back surface of the medium being collected by a take-up device. In case paper is used as the underlayer of the ink receiving layer, abundant ink consumption, as in color image printing, may increase the likelihood of curling, cockling or the like of a medium used.

When a fabric medium is used, for example, it is necessary to prepare a fabric material coated with, as the ink receiving layer, a pretreatment agent (for example, sizing agent or auxiliary agent for color development) that serves to prevent ink bleeding or assist color development. Such pretreatment should be handled by a professional specialist, resulting in time loss and cost increase.

In an attempt to increase a printing speed while heating a medium using a printing heater to prevent ink bleeding, the medium should desirably be heated at high temperatures at a position facing an inkjet head. At higher heating temperatures, however, some problems may occur. For example, ink may boil and generate bubbles, causing the ink surface to become uneven, and the resulting surface of a printed matter may become matte, losing glossiness. Another problem may be thermal impact on a surface of an inkjet head where nozzles are formed, which may increase the risk of the nozzles being clogged with ink. When a high-boiling solvent is added to ink to prevent the ink from boiling, for example, the solvent may be likely to remain on the printed medium, which may increase the risk of ink bleeding.

For example, ink containing a low-boiling solvent may be easier to evaporate and less likely to bleed. Such ink, however, may evaporate sooner in nozzles, often clogging the nozzles. Thus, the evaporation-drying ink may conventionally involve a higher risk of ink bleeding.

Such likelihood of ink bleeding when the evaporation drying inks are used may noticeably increase with higher printing speeds, color printing at higher concentrations, and duplex printing, because of an increased amount of ink landing on the medium per unit area and per unit time (amount of ejected ink). In this instance, paper mediums, if used, may be more likely to undergo curling or cockling.

To address these issues, suitable means are desirably developed that can more effectively suppress the risk of ink bleeding on a medium when latex inks are used without compromising the surface glossiness of a printed matter. This disclosure provides a printing apparatus and a printing method that may overcome the above-mentioned issues.

The inventors of this disclosure conducted various studies in the search of a method for effectively suppressing the risk of ink bleeding when latex inks are used without compromising the surface glossiness of a printed matter. The inventors came up with the idea of adding an ultraviolet absorbent to ink and irradiating the ink with ultraviolet light, instead of just heating the ink using a heater. Under ultraviolet irradiation, such ink may be heated, without being boiled, until an aqueous solvent included in the ink is adequately volatilized and removed to an extent that the ink bleeding is preventable. This may allow for efficient heating so as to adequately evaporate the ink solvent without causing the ink surface to become uneven. As a result, a sufficiently glossy printed matter may be successfully obtained. In this manner, the occurrence of ink bleeding may be more effectively avoided, without the risk of nozzles being clogged with ink or the like under heat applied.

To address the issues, this disclosure provides a printing apparatus that performs inkjet printing using a medium, the printing apparatus including: an inkjet head that ejects droplets of ink using inkjet technique so as to adhere the ink to the medium; and an ultraviolet light source that radiates ultraviolet light. The ink contains a colorant, an ultraviolet absorbent, a resin, and an aqueous solvent that emulsifies or suspends the resin. The ultraviolet light source irradiates the ink adhered to the medium with ultraviolet light to heat the ink to a temperature lower than a boiling point of the ink and high enough to prevent the ink from bleeding, so that the aqueous solvent is at least in part volatilized and removed from the ink. It is preferable that the aqueous solvent includes water and a water-soluble organic solvent. Further, it is preferable that the ultraviolet light source irradiates the ink adhered to the medium with ultraviolet light to heat the ink to a temperature lower than 100° C. The temperature to be reached is preferably higher than or equal to 65° C., and is further preferably higher than or equal to 70° C.

According to the configuration, the ultraviolet absorbent-containing ink may be efficiently heated under ultraviolet irradiation. According to this, for example, the ink may be efficiently heated immediately after droplets of the ink landed on the medium so as to volatilize the solvent away from the ink, substantially without the risk of ink bleeding or without causing the surface of a printed matter to become matte, with a reduced impact on the nozzle surface of the inkjet head.

In the printing apparatus thus configured, the ultraviolet light source may heat the ink not to boil and may thereby provide a sufficiently glossy printed surface, instead of a matte printed surface. At least part of the solvent may be volatilized and removed so as to thicken the ink on the medium until a degree of viscosity is reached at which the ink is at least prevented from bleeding on the medium. Preventing the ink from bleeding may include substantially preventing the ink from bleeding within an allowable range that meets a demanded printing accuracy.

The ultraviolet light source may volatilize the solvent away from the ink, so that the ink is prevented from bleeding without compromising the surface glossiness of a printed matter and successfully fixed to the medium. According to this configuration, the evaporation-drying ink may be favorably fixable to the medium. Fixing the ink to the medium may be completed by further heating the medium using another heating means subsequent to the ultraviolet irradiation.

In this configuration, the ultraviolet absorbent may be a material that generates heat through absorption of ultraviolet light. It is preferable that the ultraviolet absorbent may be a material having a peak wavelength for light absorption in the ultraviolet range. Further, it is preferable that the ultraviolet absorbent may be a colorless material or a faint-colored material less likely to affect the colors of inks used.

In this configuration, the ultraviolet light source may be selected from semiconductor light sources including ultraviolet LED (UVLED) and ultraviolet LD (laser diode). It is preferable that the ultraviolet light source may heat the ink at once in short time by irradiating the ink with ultraviolet light in a manner that continuous irradiation time for the same position on the medium is less than the thermal time constant of heat dissipation from the medium. It is preferable that the ultraviolet light may be radiated toward the ink on the outside of a region on the medium that faces the inkjet head. The ultraviolet light source may be used in combination with another heating device to heat the ink not to bleed. It is preferable that the ink used in this configuration includes the ultraviolet absorbent in a content greater than or equal to 0.01 wt. % and less than or equal to 5.0 wt. % to the total weight of components of the ink. It is preferable that the ultraviolet absorbent is one or more selected from, for example, benzotriazole-based ultraviolet absorbents, liquid ultraviolet absorbents, triazine-based ultraviolet absorbents, benzophenone-based ultraviolet absorbents, and benzoate-based ultraviolet absorbents.

It is preferable that the aqueous solvent includes water and a water-soluble organic solvent, and the latex ink adhered to the medium is irradiated with ultraviolet light from the light source and heated to a temperature lower than 100° C.

In this configuration, the printing apparatus may perform multi-pass printing. The number of print passes in this instance may be less than or equal to eight. For higher printing speeds, it is preferable that the number of print passes is set to less than eight (for example, less than or equal to four passes). According to this configuration, higher printing speeds may be feasible in multi-pass printing, with a suitably reduced number of print passes. While the amount of ink landing on the medium per unit area and per unit time may increase with a smaller number of print passes, the ink may be favorably prevented from bleeding by volatilizing the solvent away from the ink under ultraviolet irradiation.

The scope of this disclosure may include a printing method technically characterized as with the printing apparatus described so far. This disclosure may provide a printing method for performing inkjet printing using a medium, the printing method including steps of: (1) ejecting ink to the medium from an inkjet head and adhering the ink to the medium, the ink containing a colorant, an ultraviolet absorbent, a resin, and an aqueous solvent that emulsifies or suspends the resin; and (2) irradiating the ink adhered to the medium with ultraviolet light using an ultraviolet light source to heat the ink to a temperature lower than a boiling point of the ink and high enough to prevent the ink from bleeding, so that the aqueous solvent is at least in part volatilized and removed from the ink. It is preferable that the aqueous solvent includes water and a water-soluble organic solvent. Further, it is preferable that the ultraviolet light source irradiates the ink adhered to the medium with ultraviolet light to heat the ink to a temperature lower than 100° C. The temperature to be reached is preferably higher than or equal to 65° C., and is further preferably higher than or equal to 70° C. It is preferable that the ink used in this configuration may include the ultraviolet absorbent in a content greater than or equal to 0.01 wt. % and less than or equal to 5.0 wt. % to the total weight of components of the ink. It is preferable that the ultraviolet absorbent may be one or more selected from, for example, benzotriazole-based ultraviolet absorbents, liquid ultraviolet absorbents, triazine-based ultraviolet absorbents, benzophenone-based ultraviolet absorbents, and benzoate-based ultraviolet absorbents. Such structure may provide effects similar to the effects described earlier.

As disclosed herein, a printed matter having a sufficiently glossy printed surface, instead of a matte printed surface, may be obtained, with the risk of ink bleeding being effectively controlled, and a printing operation that provides an improved quality may be accordingly feasible.

BRIEF DESCRIPTION OF THE DRAWINGS

FIGS. 1A and 1B are respectively an upper view and a cross-sectional view of the printing apparatus 10, illustrating its main structural elements by way of an example.

FIG. 2A is an exemplified operation to eject ink droplets to a medium 50. FIG. 2B is a cross-sectional view of an example of the medium 50 after the printing operation is over.

FIG. 3A is an exemplified operation to eject ink droplets to the medium 50. FIG. 3B is a cross-sectional view of an example of the medium 50 after the printing operation is over. FIG. 3C is a cross-sectional view of an example of the medium 50, which is a non-permeable medium, after the printing operation is over.

FIG. 4 is a further detailed drawing of a thermal time constant z in the case of the medium 50.

FIG. 5A is a drawing that illustrates structural features of the printing apparatus 10. FIG. 5B is a drawing of a head portion in the printing apparatus 10.

FIG. 7A is a drawing of an exemplified printing operation for one of surfaces (front surface) of the medium 50. FIG. 7B is a drawing of an exemplified printing operation for the other surface (back surface) of the medium 50. FIG. 7C is another modified example of the printing operation using the medium 50.

DETAILED DESCRIPTION OF EMBODIMENTS

Figure 1A:
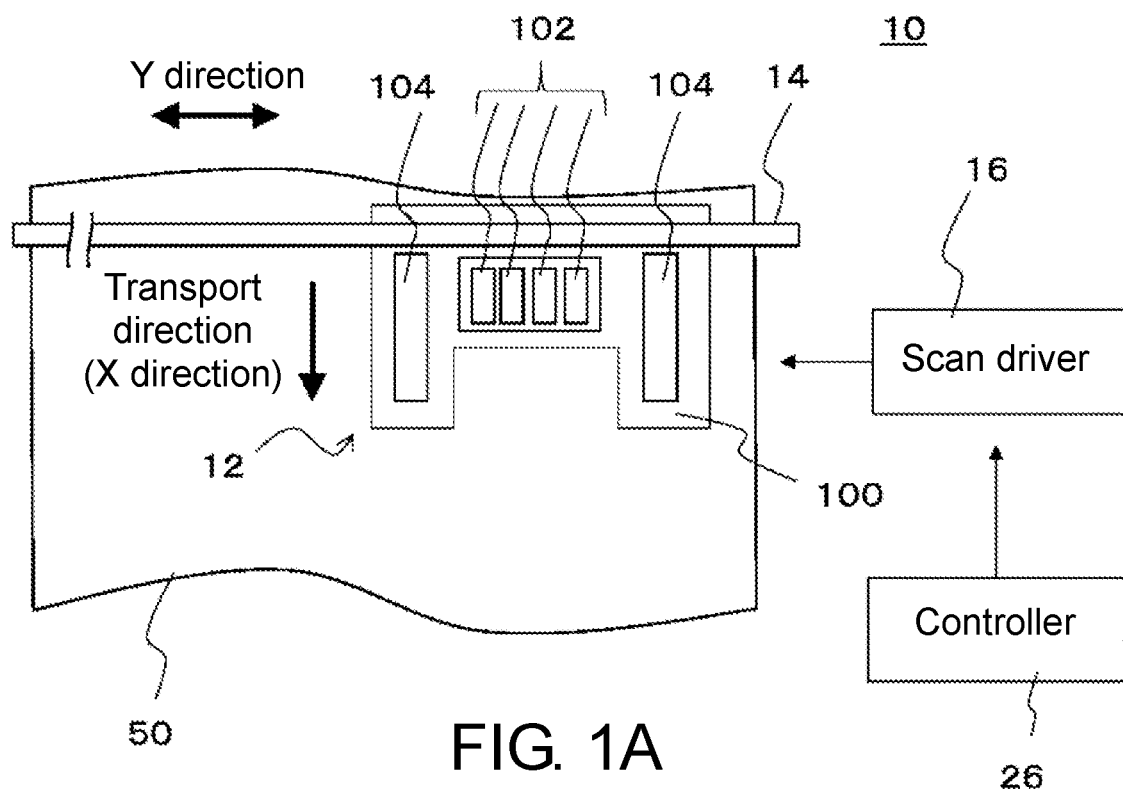
FIGS. 1A and 1B are drawings that illustrate a printing apparatus 10 according to an embodiment of this disclosure.
Figure 1B:
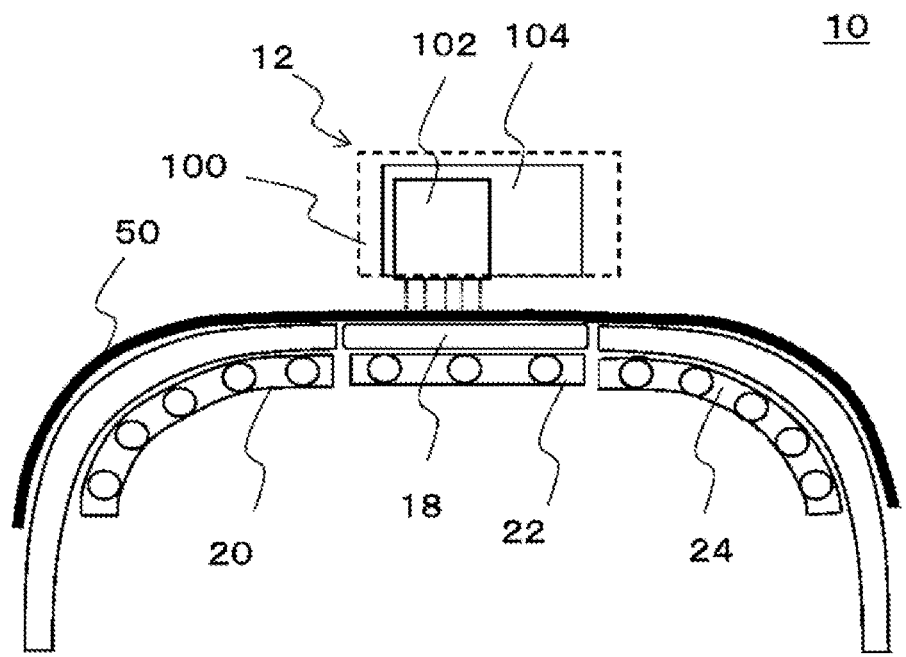

Hereinafter, embodiments of this disclosure are described in detail with reference to the accompanying drawings. FIGS. 1A and 1B are drawings that illustrate a printing apparatus 10 according to an embodiment of this disclosure. FIGS. 1A and 1B are respectively an upper view and a cross-sectional view of the printing apparatus 10, illustrating its main structural elements by way of an example. In an embodiment hereinafter described, the printing apparatus 10 is an inkjet printer that performs inkjet printing using a medium 50. The printing apparatus 10 is equipped with a head portion 12, a guide rail 14, a scan driver 16, a platen 18, a pre-heater 20, a printing heater 22, an after-heater 24, and a controller 26.

Except for aspects hereinafter described, the printing apparatus 10 may be configured identically or similarly to the known inkjet printers. In addition to the aspects described below, the printing apparatus 10 may further include any known structure that may be required for the printing operation.

The head portion 12 (IJ head portion) ejects ink droplets to the medium 50, and includes a carriage 100, a plurality of inkjet heads 102, and one or more ultraviolet light sources 104. The inkjet heads 102 may each have a plurality of nozzles, in which case the nozzles may respectively eject different color inks (for example, yellow (Y), magenta (M), cyan (C), and black (K)), or two or more nozzles may eject the same color ink. The carriage 100 is a member for holding the other structural elements of the head portion 12 (head carriage). As illustrated in FIG. 1A, the ultraviolet light sources 104 may be disposed on both sides or on one side of the group of inkjet heads 102.

The inkjet heads 102 are heads configured for inkjet ejection of ink droplets. In this embodiment, the inkjet heads 102 each have a plurality of nozzles. The inkjet heads 102 eject ink droplets having different colors and adhere the ejected different color inks to the medium 50. The inkjet heads 102 each eject droplets of aqueous latex inks containing an ultraviolet (UV) absorbent (ultraviolet-absorbable aqueous latex ink). In this instance, the ultraviolet absorbent absorbs ultraviolet light and may generate heat through absorption of ultraviolet light. The ink according to this embodiment is heated by ultraviolet irradiation. In each of the inks, the ultraviolet absorbent is dissolved or dispersed in a solvent in liquid form. In this embodiment, the color latex inks used in the inkjet heads 102 may further contain colorants that produce their colors (for example, pigments or dyes).

Specifically, the inkjet heads 102 each eject droplets of process color inks for color printing. The process colors may be yellow (Y), magenta (M), cyan (C), and black (K). The inkjet heads 102 are arranged in a predetermined main scanning direction (Y direction in the drawing). The inkjet heads 102 perform main scans in which they eject the ink droplets while moving in the main scanning direction so as to adhere the inks to the medium 50. In this embodiment, the inkjet heads 102 bidirectionally perform main scans, specifically, in one direction and the other direction included in the main scanning direction.

The ultraviolet-absorbable aqueous latex inks used in this embodiment are each an evaporation-drying ink fixable to the medium 50 by volatilizing the aqueous solvent away from the ink. The latex ink contains, for example, a colorant, an ultraviolet absorbent, a resin, and an aqueous solvent that emulsifies or suspends the resin. Suitable examples of the aqueous solvent is preferably water and water-soluble organic solvent. The water-soluble organic solvent may desirably have a boiling point higher than that of water. The ultraviolet absorbent may be selected from materials difficult to dissolve in aqueous solvents. In that case, the ultraviolet absorbent may be dispersed in the ink in solid state.

It is preferable that the ultraviolet absorbent is a material having a peak wavelength for light absorption in the ultraviolet range. Further, it is preferable that the ultraviolet absorbent may be a colorless material or a faint-colored material less likely to affect the colors of inks used. In this instance, it is preferable that absorptivity of the ultraviolet absorbent at the peak wavelength is twice or more of the maximum absorptivity in the visible light range. The absorptivity at the peak wavelength is preferably five times or more, more preferably 10 times or more, and further preferably 20 times or more of the maximum absorptivity in the visible light range.

In this embodiment, it is preferable that the ink includes the ultraviolet absorbent in a content greater than or equal to 0.01 wt. % and less than or equal to 5.0 wt. % to the total ink weight (total weight of components of the ink). It is more preferable that the content of the ultraviolet absorbent is 1.0 to 3.0 wt. % to the total ink weight. The ink having such a composition may be allowed to sufficiently absorb ultraviolet light. By avoiding the ultraviolet absorbent being added in excess of the foregoing ranges, absorption of light in the visible light range may be suitably controlled. Further, the ink may be favorably heated under the ultraviolet irradiation, substantially without such unfavorable events as cloudiness and poor color brightness of the color inks resulting from light absorption in the visible light range. An ultraviolet absorbent very transparent and less likely to absorb light in the visible light range is particularly preferable when color inks that excel in brightness are used.

When different color inks are used, as described in this embodiment, a preferred content of the ultraviolet absorbent may possibly differ from one color to another. Therefore, the content of the ultraviolet absorbent may be adjusted depending on colors. In this instance, it is preferable that the content of the ultraviolet absorbent in each of different color inks is adjusted to an extent that differences in sensitivity to ultraviolet light among the color inks stay within approximately ±50%. The sensitivity of ink to ultraviolet light may be sensitivity in terms of drying rate and/or rate of temperature rise of the ink irradiated with ultraviolet light. The features of the inks used in this embodiment will be described later in further detail.

The ultraviolet light sources 104 radiate ultraviolet light (UV irradiator for fast heating). The ink adhered to the medium 50 is irradiated with ultraviolet light from these light sources and thereby heated. The ultraviolet light sources 104 may accordingly volatilize and remove at least part of the solvent included in the ink.

In this embodiment, the ultraviolet light sources 104, in combination with another heating means such as the printing heater 22, heats the ink so as to volatilize the solvent away from the ink. A respective one of the ultraviolet light sources 104 is disposed on one side and on the other side of the group of inkjet heads 102 in the main scanning direction and moves with the inkjet heads 102 during main scans. During main scans, one of the ultraviolet light sources 104 is behind the inkjet heads 102 in a direction of movement of the inkjet heads 102, while the other one is ahead of the inkjet heads 102 in the direction of movement. In each main scan bidirectionally performed, the ink on the medium 50 is irradiated with ultraviolet light from the ultraviolet light source 104 behind the inkjet heads 102 in a current direction of movement of the inkjet heads 102. The ultraviolet light source 104 may accordingly radiate ultraviolet light toward a region that the inkjet heads 102 passed, so that the ink that just landed on the medium 50 is irradiated with ultraviolet light. The ink is thus increased in viscosity before starting to bleed on the medium 50 so as to reduce the risk of ink bleeding.

It is preferable that the ultraviolet light sources 104 is selected from ON/OFF controllable light sources configured to radiate ultraviolet light. Such a light source may be an ultraviolet semiconductor light source, for example, UVLED (UVLED irradiator) or ultraviolet LD (laser diode). As a result, ultraviolet light may be very accurately radiated at any time desired. In this embodiment, the ultraviolet light sources 104 are each a UVLED-equipped light source (UV-LED irradiator). In this instance, it is preferable that the ultraviolet light source 104 is a condensing LED irradiator that condenses ultraviolet light. The ultraviolet light source 104 may be regarded as a UV fast heating means that rapidly heats and dries the ink that landed on the medium 50 in a predetermined period of time.

In this embodiment, the ultraviolet light sources 104 are displaced relative to the inkjet heads 102 and accordingly radiate ultraviolet light toward the ink on the outside of a region of the medium 50 facing the inkjet heads 102. In the illustrated example, the ultraviolet light sources 104 are displaced relative to the inkjet heads 102 in the main scanning direction so as to radiate ultraviolet light toward the ink on the outside of a region of the medium 50 facing the inkjet heads 102. This may suitably prevent that the evaporated solvent and ultraviolet-heated ink adversely affect the inkjet heads 102. A duration of time before ultraviolet radiation starts after the ink landed on the medium 50 may be appropriately adjusted by changing a distance between the inkjet heads 102 and the ultraviolet light sources 104. The duration of ultraviolet radiation from the ultraviolet light sources 104 (continuous irradiation time) may be appropriately adjusted by adjusting the width of the ultraviolet light source 104, 104 in the main scanning direction.

The width of the ultraviolet light source 104, 104 in a sub scanning direction (X direction in the drawing) orthogonal to the main scanning direction is preferably greater than or equal to a printing width of the inkjet heads 102. The printing width of the inkjet heads 102 may be the width of a region in the sub scanning direction to which the ink droplets are ejected from the inkjet heads 102 in one main scan. In this embodiment, the sub scanning direction is parallel to a direction in which the medium 50 is transported (paper feed direction).

In this embodiment, the width of the ultraviolet light source 104, 104 is greater than the printing width in the sub scanning direction as illustrated in FIG. 1A. The ultraviolet light source 104, 104 may accordingly radiate ultraviolet light toward any part of the medium but a part in front of the inkjet heads 102 in the sub scanning direction. The ultraviolet light sources 104 are thus allowed to radiate ultraviolet light toward, as well as a region in front of the inkjet heads 102, a region more downstream than the inkjet heads 102 in the transport direction of the medium 50. Then, timing of ending heating using the ultraviolet light sources 104 may be appropriately adjusted. The ultraviolet radiation allowed for the more downstream region than the inkjet heads 102 may reduce time to fully evaporate and dry the ink after the heating started.

In this embodiment, the ultraviolet light sources 104 may volatilize and remove at least part of the solvent so as to thicken the ink on the medium 50 until a degree of viscosity is reached at which the ink is at least prevented from bleeding on the medium 50. The ink bleeding described herein may be specifically inter-color bleeding that occur when inks having different colors are mixed into each other. The bleeding-preventable degree of viscosity may be specifically a degree of viscosity at which the occurrence of ink bleeding is preventable before the ink is fully dried and fixed to the medium 50. Preventing the ink from bleeding may suggest substantially preventing the ink from bleeding within an allowable range that meets a demanded printing accuracy. Specifically, the ultraviolet light sources 104 may increase the viscosity of ink on the medium 50 under ultraviolet irradiation to, for example, greater than or equal to 50 mPa·s, preferably greater than or equal to 100 mPa·s and more preferably greater than or equal to 200 mPa·s.

The directivity of ultraviolet light radiated from the ultraviolet light sources 104 is preferably set such that ultraviolet light does not arrive at nozzle surfaces of the inkjet heads 102. This may suitably prevent that heating using the ultraviolet light sources 104 has any adverse impact on the inkjet heads 102. The mechanism of irradiating the ink with ultraviolet light from the ultraviolet light sources 104 will be described later in further detail.

The guide rail 14 is a member including a rail. The guide rail 14 extends in the main scanning direction and guides movement of the carriage 100 in the main scanning direction. The scan driver 16 prompts the inkjet heads 102 to perform main scans and sub scans.

In this embodiment, the scan driver 16 moves the carriage 100 along the guide rail 14 so as to move the inkjet heads 102 held in the carriage 100 in the main scanning direction. Then, the scan driver 16 prompts the inkjet heads 102 to perform main scans in which the moving inkjet heads 102 eject the ink droplets based on printing data indicating an image to be printed (for example, color image).

In sub scans performed by the inkjet heads 102, the inkjet heads 102 may be moved in the sub scanning direction relative to the medium 50. In this embodiment, the scan driver 16 transports the medium 50 in the transport direction parallel to the sub scanning direction to prompt the inkjet heads 102 to perform sub scans. The scan driver 16 transports the medium 50 at an interval between the main scans so as to change a region of the medium 50 that faces the inkjet heads 102 in a next one of the main scans. In this manner, the scan driver 16 prompts the inkjet heads 102 to eject the ink droplets to different positions on the medium 50. In this embodiment, the scan driver 16 also moves the ultraviolet light sources 104 with the inkjet heads 102 during main scans and prompts the ultraviolet light sources 104 to radiate ultraviolet light at positions of the ink droplets ejected from the inkjet heads 102.

The platen 18 is a table-like member disposed at a position opposite to the head portion 12. The medium 50 is mounted on and supported by the upper surface of the platen 18 so as to face the head portion 12. In this embodiment, the platen 18 has, in its inner space, the pre-heater 20, printing heater 22, and after-heater 24 that are provided to heat the medium 50.

The pre-heater 20, printing heater 22, and after-heater 24 are used to heat the medium 50 and consequently heats the ink thereon through the medium 50 so as to volatilize and remove the solvent and dry the ink. By using such additional heating means in combination with the ultraviolet light sources 104, the solvent may be more effectively volatilized away from the ink. This may further accelerate drying of the ink, allowing the ink to be more reliably fixed to the medium 50.

The pre-heater 20 is used for preliminary heating of the medium 50. The pre-heater is disposed at a position more upstream than the inkjet heads 102 in the transport direction of the medium 50 so as to preliminarily heat a region of the medium 50 where the ink droplets will be ejected. The printing heater 22 heats the medium 50 at a position opposite to the inkjet heads 102. The ultraviolet light sources 104 irradiate the ink on the medium 50 heated by the printing heater 22 with ultraviolet light so as to volatilize and remove at least part of the solvent included in the ink in collaboration with the printing heater 22. In this manner, the solvent may be sufficiently volatilized away from the ink that just landed on the medium 50, and the ink may be sufficiently thickened before starting to bleed on the medium 50.

The after-heater 24 is disposed at a position more downstream than the inkjet heads 102 in the transport direction. The after-heater 24 further heats the medium 50 that passed the printing heater 22 and the ultraviolet light sources 104 so as to remove any residue of the solvent that failed to be removed by the ultraviolet light sources 104 and the printing heater 22. Thus, the ink may be more certainly dried and fixed to the medium 50 by the after-heater 24.

FIGS. 1A and 1B illustrate, as an example of the after-heater 24, a thermal conductivity heater that heats the medium 50 through thermal conduction transmitted from inside of the platen 18. In case the medium 50 has poor thermal conductivity, the after-heater 24 may be selected from any other suitable heating means but the thermal conductivity heater. In this instance, the after-heater 24 may be a dryer such as a hot-air heater or an infrared heater. Optionally, any suitable one selected from such dryers may be used in combination with the after-heater 24 of thermal conductivity type.

The controller 26 may be the CPU of the printing apparatus 10 that controls the structural elements of the printing apparatus 10. According to this embodiment, the printing operation using the medium 50 may be successfully performed.

In this embodiment, the ultraviolet absorbent-containing ink may be efficiently heated under ultraviolet irradiation immediately after droplets of the ink landed on the medium. Such heating efficiency may allow for lower heating temperatures of the printing heater 22 of this embodiment that heats the medium 50 at a position opposite to the inkjet heads 102. According to this embodiment, the solvent may be adequately volatilized and removed from the ink, substantially without any impact on nozzle surfaces of the inkjet heads 102. Then, the ink may be sufficiently increased in viscosity before the ink starts to bleed, undermining surface properties of a printed matter.

The ink dried under ultraviolet irradiation may be suitably fixed to the medium 50. In this embodiment, the medium 50 is heated by the pre-heater 20, printing heater 22, and after-heater 24. The ink may be accordingly more effectively dried than being heated by the ultraviolet light sources 104 alone. Thus, this embodiment may effectively prevent the occurrence of ink bleeding and reduce the risk of undermining surface properties of a printed matter when the ultraviolet-absorbable aqueous latex ink is used. According to this embodiment, therefore, a printing operation that provides an improved quality may be successfully performed.

The printing apparatus 10 according to this embodiment may be considered to use a plurality of heating means as means for drying (fixing) the ultraviolet-absorbable aqueous latex ink. Specifically, the printing heater 22 may be a first heating means that heats the medium 50 from the back surface side at a position at which the ink droplets are ejected from the inkjet heads 102 (printing position), and the ultraviolet light sources 104 may be a second heating means used in combination with the first heating means. It is preferable that the heating temperature of the first heating means is 70° C. or below, and more preferably 60° C. or below. The second heating means irradiate the ink droplets on the medium 50 at different positions with ultraviolet light in the order that the ink droplets ejected from the inkjet heads are landing on the medium 50. It is preferable that the second heating means is ON/OFF controllable ultraviolet light sources 104.

The printing apparatus 10 according to a modified example may be equipped with the second heating means alone, instead of the first and second heating means both. In this instance, the ink may be heated by the ultraviolet light sources 104 alone without the printing heater 22. In another modified example of the printing apparatus 10, an additional heating means may be further used in combination with the ultraviolet light sources 104 and the printing heater 22. For example, the printing apparatus 10 may be further equipped with an infrared light source disposed at a position opposite to the after-heater 24 and more downstream than the ultraviolet light sources 104 in the transport direction. Then, combined use of the infrared light source and the after-heater 24 may allow the ink on the medium 50 to be heated well and fully dried. In case such an infrared light source is used as a heating means, the after-heater 24 may be unnecessary.

In this embodiment, ultraviolet light having a lower impact on ink color is used to heat the ink. Another possible means for heating ink using light with less impact on ink color may be an infrared light source that emits infrared light, which may be used instead of the ultraviolet light sources 104. In this instance, an infrared absorbent having transparency against light in the visible light range is added to the ink, and the risk of ink bleeding may be suppressed likewise without any impact on coloration of a print result.

However, the infrared absorbents, with some exceptions, typically exhibit very high absorbency that cannot be disregarded for light in the visible light range. An attempt to minimize possible impact on coloration of a print result may naturally narrow down a range of materials usable as the infrared absorbent. As a result, any ink with desired properties may become difficult to use.

On the other hand, many of the known ultraviolet absorbents have substantially low absorbency for light in the visible light range. Therefore, an ultraviolet absorbent most suitable for properties of ink used may be easily selected from a diverse range of options. This embodiment may accordingly allow the ink bleeding to be more effectively prevented without comprising the surface glossiness of a printed matter.

When a plurality of color inks are used as described in this embodiment, use of infrared light for heating purpose may involve the risk of color-dependent variability among the color inks heated. In case regular pigment inks are used, for example, ink containing a black (K) pigment of carbon black absorbs more infrared light than any other color inks. If the intensity of infrared light is increased so as to sufficiently dry the other color inks of Y, M, and C, the black ink may be burnt. If the intensity of infrared light is set suitably for the black ink, the respective color inks may be dried to different degrees. This, as well as the other factors, may strongly suggest that ultraviolet light should preferably be used.

Figure 2A:
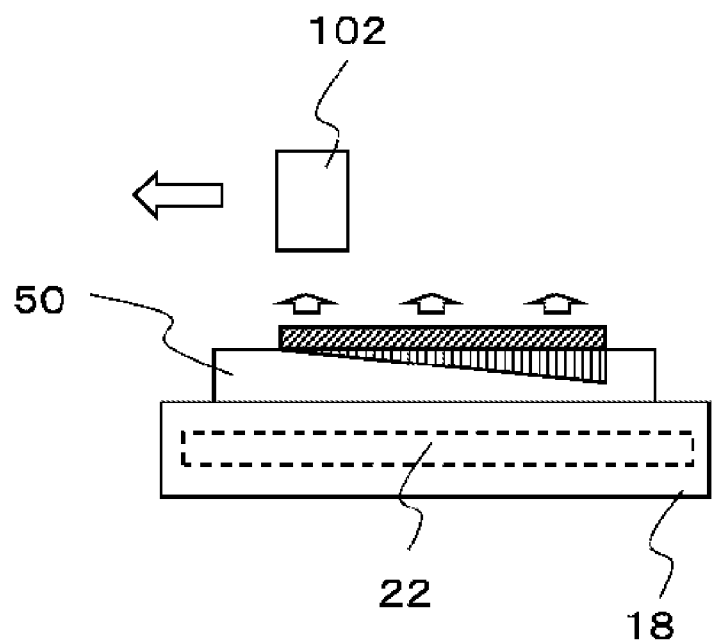
FIGS. 2A and 2B are schematic drawings of an exemplified printing operation of a conventional printing apparatus.
Figure 2B:
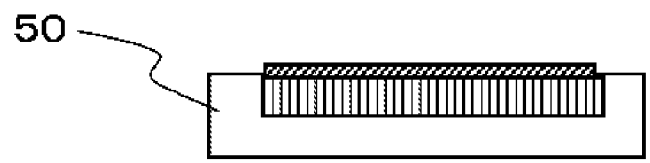

A printing operation using the medium 50 in this embodiment is hereinafter described in further detail. To better understand this embodiment, the description starts with an exemplified printing operation of a conventional printing apparatus. FIGS. 2A and 2B are drawings that illustrate in a simplified manner (modeled example) an exemplified printing operation of a conventional printing apparatus (drying process model). In this printing operation, ink containing no ultraviolet absorbent is used and dried by a heater provided in the platen 18 alone (for example, printing heater 22) (printing operation in which no ultraviolet absorbent-containing ink is used).

The printing operation illustrated in FIGS. 2A and 2B may be carried out by a printing apparatus similar or identical to the printing apparatus 10 of FIGS. 1A and 1B from which the ultraviolet light sources 104 have been removed. It is preferable that the heating temperature of the printing heater 22 is suitably adjusted in accordance with technical aspects that differ from the printing apparatus 10 of FIGS. 1A and 1B.

FIG. 2A is an exemplified operation to eject ink droplets to a medium 50. FIG. 2B is a cross-sectional view of an example of the medium 50 after the printing operation is over. Referring to FIGS. 2A and 2B, ink used in this printing operation may be similar or identical to the ink used in the printing apparatus 10 of FIGS. 1A and 1B, except that the ink contains no ultraviolet absorbent. This ink may be a known evaporation-drying ink. Specifically, a known aqueous latex ink is used in the printing operation of FIGS. 2A and 2B. The medium 50 used in this printing operation has absorbency for ink before its solvent is volatilized and removed (permeable medium). Specific examples of such medium 50 may include paper and fabric.

In the printing operation of this conventional printing apparatus using the ultraviolet-absorbable aqueous latex ink, the whole medium 50 is heated by, for example, the printing heater 22 so as to volatilize and remove the solvent in the ink and thereby suppress the risk of ink bleeding on the medium 50. As illustrated in FIG. 2A, droplets of the ink are ejected from the inkjet heads 102 to the medium 50 being heated by the printing heater 22.

The whole region of the medium 50 to which the ink droplets have been adhered is heated by the printing heater 22 disposed at a position opposite to the inkjet heads 102 in the platen 18 until a certain temperature is reached, for example, approximately 70° C. or below (for example, 50 to 70° C.) and preferably 60° C. or below (for example, 50 to 60° C.). This heating increases the temperature of a layer of the ink formed on the surface of the medium 50 to a degree low enough not to boil the ink until the aqueous solvent is volatilized away from the ink to an extent that the occurrence of ink bleeding is preventable, so that the ink is increased in viscosity. Then, the ink may be prevented from bleeding on the medium without compromising the surface glossiness of a printed matter.

When the medium 50 is heated by the printing heater 22, the inkjet heads 102 disposed opposite to the printing heater 22 across the medium 50 may be affected by heat radiation. If the heating temperature of the printing heater 22 exceeds the before-mentioned ranges, heat radiation may have an even greater impact on the inkjet heads 102. As a result, the ink in the vicinity of nozzles of the inkjet heads 102 may become dry, possibly clogging the nozzles. Therefore, higher heating temperatures than the before-mentioned ranges may be difficult to employ. When the heating temperatures is increased for a higher evaporation rate of the solvent, the evaporated solvent may be likely to agglutinate and adhere to the inkjet heads 102 whose temperature is relatively low, undermining the stability of ink ejection from these inkjet heads. This is another reason why the heating temperature of the printing heater 22 is desirably not increased.

On the other hand, lower heating temperatures than the before-mentioned ranges may require more drying time, possibly increasing the risk of ink bleeding. Another possible risk may be penetration of too much ink into the medium 50 before the ink is sufficiently dried. Therefore, lower heating temperatures than the before-mentioned ranges may be difficult to employ. To dry the ink using the printing heater 22, the medium 50 is preferably heated at a temperature in the before-mentioned ranges (medium temperatures). By heating the medium 50 using the printing heater 22 at such a medium temperature, the solvent may be volatilized away from the ink, substantially without any adverse impact from heat radiation.

Yet, higher printing speeds may conversely slow down the drying rate, possibly increasing the risk of ink bleeding. Higher printing speeds may necessitate a decreased number of print passes. In the conventional printing operation described earlier, approximately 8 to 32 print passes may be typically set. A smaller number of print passes may increase the amount of ink landing on the medium per unit area and per unit time, and such an increased amount of ink may not be fully dried in time. In case the medium 50 is a permeable medium, the capillarity may cause the ink to penetrate too deep into the medium 50 over time after landing on the medium, as illustrated in the medium 50 with a hatch pattern. As a result, the amount of ink left on the surface of the medium 50 may decrease. This may lower the concentrations of printing inks, leading to a poorly colored print result. Such a poorly colored print result (printed matter) may often appear blurred. Higher printing speeds, if employed in the conventional printing apparatus, may often lead to a higher risk of ink bleeding and a print result poorly colored when a pattern/image-printed surface is observed.

Higher temperatures of the printing heater 22 are deemed to be a solution to the problem of ink bleeding because the solvent evaporation rate is correspondingly accelerated, which may be a solution to the problem of ink bleeding. At higher heating temperatures of the printing heater 22, however, the ink may boil and accordingly have an uneven surface. As a result, the surface of a printed matter may become matte, losing a surface glossiness expected of a printed matter. Moreover, heat radiation may have a greater impact on nozzle surfaces of the inkjet heads 102 at a position opposite to the printing heater 22, increasing the risk of nozzles being clogged with ink. In this regard, an upper limit should naturally be set for the heating temperature of the printing heater 22 to ensure stability in the ejection of ink droplets. In any known printing apparatuses in which the amount of ink landing on the medium per unit area and per unit time is unavoidably increased at higher printing speeds, there is certainly a ceiling to possible printing speeds.

In the conventional printing apparatuses, therefore, the heating temperature of the printing heater 22 may be often approximately between 50° C. and 60° C. or between 40° C. and 60° C. As described earlier, higher printing speeds at such heating temperatures may involve the risks of ink bleeding and penetration of too much ink into the medium 50. A print result (printed matter) thus obtained may often appear blurred. These problems may become more noticeable with even lower heating temperatures of the printing heater 22 (for example, approximately 40° C.).

At such low temperatures and dry conditions and at high printing speeds, the amount of ink landing on the medium per unit area and per unit time thus increases, and the ink may be likely to spread along and bleed on the surface of the medium 50. When the number of print passes is reduced to, for example, eight passes or less (one to eight passes) for higher printing speeds, the amount of ink landing on the medium per unit area and per unit time may be increased. When the temperature is then set to degrees at which poor ink ejection is avoidable, it becomes more difficult to prevent the ink bleeding using the printing heater 22 alone. Thus, the known printing apparatuses were conventionally difficult to perform high-speed printing with a reduced risk of ink bleeding.

Adding a solvent having a low boiling point to the ink may be an option in order to increase the evaporation rate and reduce the risk of ink bleeding. However, the ink containing such a solvent may be rapidly evaporated in the inkjet heads 102 and likely to clog the nozzles, resulting in poor ink ejection, as is the case of increasing the heating temperature of the printing heater 22. This option, therefore, fails to be a solution to the issues of the known art.

Figure 3A:
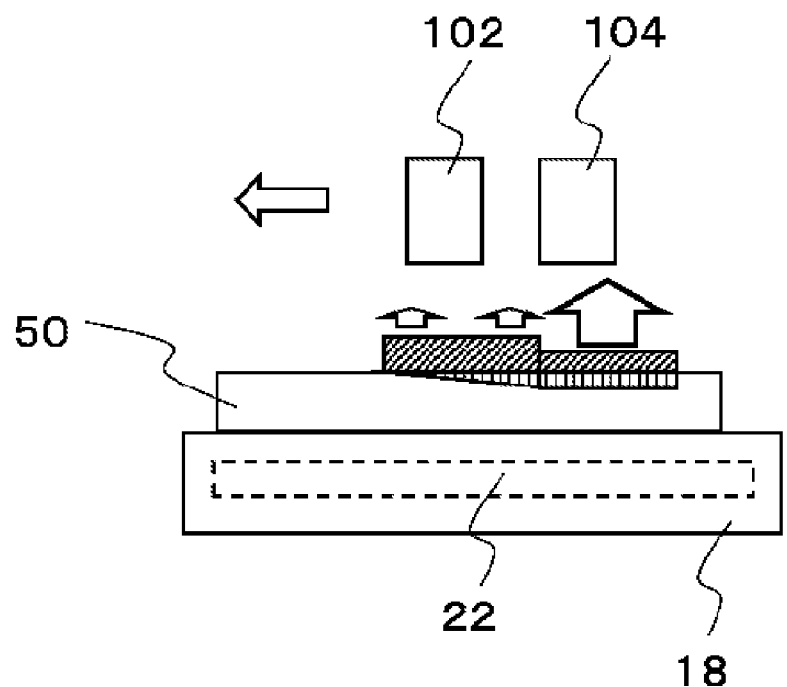
FIGS. 3A to 3C are schematic drawings of an exemplified printing operation of the printing apparatus 10.
Figure 3B:
Figure 3C:
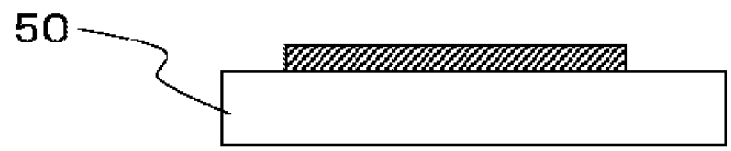

The printing apparatus 10 according to this embodiment described referring to FIGS. 1A and 1B, on the other hand, uses the ultraviolet absorbent-containing aqueous latex ink and heats this ink to a temperature low enough not to boil so as to volatilize the solvent away from the ink to an extent that the ink bleeding is avoidable. The printing apparatus 10 according to this embodiment successfully address the issues of the known art. FIGS. 3A to 3C are drawings that illustrate in a simplified manner (modeled example) an exemplified printing operation of the printing apparatus 10 according to this embodiment (drying process model). FIG. 3A is an exemplified operation to eject ink droplets to the medium 50.

As described earlier, the printing apparatus 10 of this embodiment rapidly volatilizes the solvent away from the ink using the ultraviolet light sources 104 and the printing heater 22, and thereby dries the ink that just landed on the medium 50 so as to thicken the ink to a degree of viscosity at which the ink bleeding is preventable. As compared with the ink being dried, for example, by the printing heater 22 alone, the heating temperature of the printing heater 22 may be set to a lower degree. The heating temperature of the printing heater 22 may be specifically a heating temperature of the printing heater 22 set for a region facing the inkjet heads 102.

This may reduce heat radiation generated by the printing heater 22 heating the ink and may accordingly reduce risks of the ink being dried the nozzle surfaces of the inkjet heads 102 and clogging the nozzles. In this embodiment, the ultraviolet light sources 104 radiate ultraviolet light toward the ink on the outside of a region of the medium 50 facing the inkjet heads 102, as illustrated in FIG. 3A. Then, at a position on the medium 50 opposite to the inkjet heads 102, the solvent in the ink is heated by the printing heater 22 alone and thereby relatively slowly evaporated. This may prevent that the evaporated solvent may agglutinate and adhere to the inkjet heads 102. As a result, improved stability of ink ejection may be achieved.

The ink ejected from the inkjet heads 102 that landed on the medium 50 is, before being irradiated with ultraviolet light from the ultraviolet light sources 104, preliminarily heated by the printing heater 22 at a relatively low temperature, for example, lower than or equal to 70° C., and preferably lower than or equal to 60° C. (for example, approximately 20 to 60° C.) in a region of the medium 50 facing the inkjet heads 102. The heating temperature of the printing heater 22 is preferably a platen temperature between approximately 20° C. and 55° C., and more preferably around 55° C. The heating temperature of the printing heater 22 may be substantially equal to heating temperatures of the known low-speed printers that are not equipped to perform high-speed printing.

In this embodiment, the ultraviolet light sources 104 radiate ultraviolet light toward the vicinity of a region facing the inkjet heads 102 and directly heats the ink in the region so as to rapidly evaporate the solvent in the ink at a temperature low enough not to boil the ink and thicken the ink to a higher degree of viscosity. Thus, the ink may be sufficiently increased in viscosity before starting to bleed. The ink may be accordingly increased in viscosity before a large portion of the ink is absorbed into the medium 50. This may prevent that an inadequately thin ink layer is formed on the surface of the medium 50. By radiating ultraviolet light toward any region but a region facing the inkjet heads 102, the inkjet heads 102 may be unlikely to be affected by the solvent evaporation and/or heat radiation generated by ultraviolet light from the ultraviolet light sources 104. In this embodiment, therefore, the ink that landed on the medium may be rapidly increased in viscosity without undermining the stability of ink ejection.

Referring to FIGS. 1A and 1B and 3A to 3C, the ultraviolet light sources 104 move with the inkjet heads 102 in the main scanning direction during main scans. The ultraviolet light source 104 behind the inkjet heads 102 in the moving direction of these inkjet heads irradiates the ink on the medium 50 with ultraviolet light. In this manner, ultraviolet radiation from the ultraviolet light source 104 starts immediately after the inkjet heads 102 passed a respective one of positions on the medium 50, so that ultraviolet light is selectively absorbed by the ink that already landed on the medium alone. Thus, instead of the whole medium 50 being heated to a high temperature, an ink layer formed on the medium 50 alone may be selectively and rapidly heated. The occurrence of ink bleeding may be prevented by thus heating the ink so as to volatilize the solvent away from the ink and thicken the ink to a higher degree of viscosity.

As described earlier, the ultraviolet light source 104 radiates ultraviolet light toward a region on the medium 50 after the inkjet heads 102 passed the region. This may prevent such unfavorable events that the inkjet heads 102 are affected by heat radiation during heating using the ultraviolet light sources 104 and that the solvent evaporated under ultraviolet irradiation agglutinate and adhere to the nozzle surfaces of the inkjet heads 102. This is another advantage of this embodiment that may ensure the stability of ink ejection.

This embodiment uses the ultraviolet-absorbent-containing aqueous latex ink, as described earlier. Such ink may be reliably fixed to the medium 50 by volatilizing the aqueous solvent away from the ink using the printing heater 22 and the ultraviolet light sources 104. Referring to FIGS. 1A and 1B and 3A to 3C, the ink is further heated by the after-heater 24 disposed at a position more downstream than the ultraviolet light sources 104 in the transport direction of the medium 50, so that the ink is fully dried. In this embodiment, therefore, the ink may be more reliably fixed to the medium 50.

FIG. 3B is a cross-sectional view of an example of the medium 50 after the printing operation is over. In this embodiment, when the medium 50 is a permeable medium, for example, the ultraviolet-absorbable aqueous latex ink may be thickened to a higher degree of viscosity before a large portion of the ink is absorbed into the medium 50, and the ink may be accordingly rapidly dried on and near the surface of the medium 50. This embodiment, therefore, may allow only a small amount of ink to penetrate into the medium 50 (shallow penetration), leaving a large amount of unabsorbed ink in the vicinity of the surface of the medium 50. The ink may accordingly remain thick on the medium surface. As a result, a print result favorably rich in color and vivid may be obtained, instead of a faintly colored print result. The ink may be heated to a temperature low enough not to boil, and the solvent included in the ink may be volatilized and removed to an extent that the occurrence of ink bleeding is preventable. According to this embodiment, the printing operation using the medium 50 may be successfully performed, in which glossiness may be imparted to the surface of a printed matter, with the risk of ink bleeding being effectively reduced. The ratio and duration of time of any residual solvent remaining on the permeable medium 50 may be decreased by using the ultraviolet light sources 104 or the like, and such events as cockling and curling of the medium 50 made of, for example, paper may be successfully prevented.

In this embodiment, the ink may be reliably cured in short time by volatilizing the aqueous solvent away from the ultraviolet-absorbable aqueous latex ink under ultraviolet irradiation. Therefore, the printing-completed medium 50 may be promptly shifted to other steps that follow. In case the printing speed is increased in the printing apparatus 10 configured to roll up the printing-completed medium 50, the ink may be prevented from bleeding through to the back surface side of the rolled-up medium.

The inventors of this disclosure conducted tests, in which they were convinced that approximately 80% of the solvent was successfully removable from the ultraviolet-absorbable aqueous latex ink under ultraviolet irradiation using the ultraviolet light sources 104. In this embodiment, therefore, most of the aqueous solvent may be removed from the ink by ultraviolet irradiation alone so as to fix the ink to the medium 50.

When the medium 50 is a permeable medium, the ultraviolet light sources 104, if used as described in this embodiment, may still fail to prevent a trace amount of ink from penetrating into the medium 50, as illustrated in FIG. 3B. A trace amount of ink may unavoidably penetrate into the medium. Yet, the amount of ink that penetrates into the medium may be significantly decreased, as compared with the known art in which the ultraviolet light sources 104 are not used.

Since the medium 50 used in the printing apparatus 10 of this embodiment is not particularly limited to any particular types of mediums, any ink-impermeable (non-permeable, non-absorbable) mediums may possibly be used as the medium 50 in the printing apparatus 10.

FIG. 3C is a cross-sectional view of an example of the medium 50, which is a non-permeable medium, after the printing operation is over. When the medium 50 is a non-permeable medium, the medium 50 does not absorb ink even before the ink is increased in viscosity under ultraviolet irradiation or by heating using the printing heater 22, and the ink may remain thick on the surface of the printing-completed medium 50. In this instance, the ink may be thickened to a higher degree of viscosity under ultraviolet irradiation using the ultraviolet light sources 104 to ensure that the occurrence of ink bleeding does not occur. As a result, the printing operation using the medium 50 may be successfully performed, with a reduced risk of ink bleeding or the like.

Since absorption of the ink into the medium 50 is avoidable, the amount of ink ejected and adhered to the medium 50 may be decreased, in contrast to any permeable mediums 50. As a result, the occurrence of ink bleeding may be effectively suppressed, and color printing at higher concentrations may be feasible with a reduced amount of ink.

Various technical features associated with this embodiment are hereinafter described in further detail. The description starts with higher printing speeds enabled by this embodiment.

In this embodiment, as described earlier, the ink is irradiated with ultraviolet light from the ultraviolet light sources 104 so as to heat the ink to a temperature low enough not to boil the ink and high enough to volatilize the aqueous solvent away from the ink to an extent that the risk of ink bleeding is preventable. As a result, the ink that landed on the medium 50 may be sufficiently increased in viscosity before starting to bleed without causing the ink surface to become uneven. Therefore, higher printing speeds may be feasible by increasing the amount of ink landing on the medium per unit area and per unit time without compromising the surface glossiness of a printed matter.

Inkjet printing, as in the printing apparatus 10 of this embodiment, often employ multi-pass printing in which multiple main scans are performed at each of positions on the medium 50. In a printing operation according to the known art using the latex ink, the amount of ink ejected in one main scan (pass) may need to be increased to prevent the occurrence of ink bleeding.

Assuming that one-pass printing, instead of multi-pass printing, is employed in which a single main scan is performed at each position on the medium 50 using, for example, four YMCK color latex inks conventionally often used as color printing inks, the amount of ink is 100% at most per color and is 400% in four colors in total. Such a large amount of latex ink ejected in one main scan in the known art may usually start to bleed. If the ink is overly heated to increase the drying rate, the ink may possibly start to boil and become uneven on its surface, losing the surface glossiness of a printed matter. Thus, a satisfactory print result may be difficult to obtain in one-pass color printing.

The known printing apparatuses conventionally employ multi-pass printing with at least eight passes or more, in which the amount of ink ejected in one main scan is 12.5% at most per color and is 50% in four colors in total. A higher printing accuracy may demand a larger number of passes (for example, 16 passes, 32 passes). Thus, the known art may require a certain number of passes or more to ensure that ink bleeding does not occur. A larger number of passes, however, may significantly lower the printing speed. In the known art, therefore, difficulty with increasing the printing speed may be a bigger issue than such problems as a matte printed surface and ink bleeding during the process to dry the ink solvent.

In this embodiment, while the amount of ink landing on the medium per unit area and per unit time may increase with a smaller number of print passes, the ink may be prevented from bleeding by having the solvent volatilized away from the ink under ultraviolet irradiation. According to this embodiment, therefore, higher printing speeds may be feasible with a suitably reduced number of print passes in the multi-pass printing. As a result, the occurrence of ink bleeding may be more effectively avoidable at higher printing speeds beyond limits of the known methods.

When the amount of ink ejected per unit area and per unit time increases to an extent that the ink bleeding is inevitable with the printing heater 22 alone when the number of print passes is set to, for example, eight passes or less (one to eight passes), this embodiment may successfully avoid the occurrence of ink bleeding by using the ultraviolet light sources 104 without causing the surface of a printed matter to become matte. This embodiment may enable a printing operation that provides high-quality print results that excel in glossiness with a reduced risk of ink bleeding, as compared with the known art. This embodiment may thus provide a high-speed printing apparatus in which the number of print passes is set to eight passes or less.

For higher printing speeds, the number of print passes may be less than eight passes (for example, less than or equal to four passes). Any effect obtained by avoiding the ink bleeding using the ultraviolet light sources 104 without causing the surface of a printed matter to become matte may be particularly noticeable when the number of print passes is set to, for example, approximately 14 passes. This embodiment is not necessarily limited to multi-pass printing but is applicable to one-pass printing.

When the ink used has a very slow drying rate, a particularly noticeable effect may be obtained even with four or more print passes. In a printing operation with a larger number of passes than eight, for example, multi-pass printing with approximately 32 print passes (for example, 16 to 32 passes), use of the ultraviolet light sources 104 may conduce to an outstanding outcome in an attempt to prevent the ink bleeding without causing the surface of a printed matter to become matte.

Such an attempt to prevent the ink bleeding using the ultraviolet light sources 104 without losing the surface glossiness of a printed matter may achieve an outstanding outcome in any printers but high-speed printers. In any printing operations but high-speed printing, for example, the medium 50 on which the ink is likely to bleed, like paper or fabric, may achieve a great success in such an attempt to prevent the ink bleeding using the ultraviolet light sources 104 without compromising the surface glossiness of a printed matter. The printing apparatus 10 of this embodiment is not necessarily limited to particular fields to which high-speed printing is applied (for example, sign graphics (SG)), but is also applicable to various printing-related fields. In this embodiment, adjacent ink dots may be sufficiently increased in viscosity before they start to merge into one another. The ink dots may possibly merge into one another, possibly generating a streak-like pattern. Such an unwanted event may be avoided in this embodiment.

The features of the inks used in this embodiment are hereinafter described in further detail. As described earlier, the ultraviolet-absorbable aqueous latex ink used in this embodiment contains such materials as an ultraviolet absorbent, a resin, a solvent, an aqueous solvent that emulsifies or suspends the resin, and a colorant. Specific examples of the ultraviolet absorbent preferably include materials having absorption characteristics suitable for the wavelength of ultraviolet light radiated from the ultraviolet light sources 104. For example, the ultraviolet absorbent desirably used may be preferably absorbents that exhibit intense light absorbency for the luminous wavelength range of the ultraviolet light source 104 such as UVLED. This may be rephrased that the ultraviolet light source 104 desirably used may be preferably such light sources that emit ultraviolet light in a wavelength range absorbable by the ultraviolet absorbent added to the ink. The luminous wavelength range of the ultraviolet light source 104 may be preferably substantially identical to that of the ultraviolet absorption band of the ultraviolet absorbent added to the ink.

Specifically, the ultraviolet light sources 104 preferably radiate ultraviolet light having a wavelength less than or equal to 410 nm. Suitable examples of such an ultraviolet light source 104 may include light sources using UVLED having a luminous center wavelength in near ultraviolet range (for example, 250 to 410 nm, and preferably 250 to 400 nm). In this instance, an ultraviolet absorbent having intense absorbency for a predetermined wavelength range less than or equal to 410 nm of ultraviolet light preferably added to ink and irradiated with the ultraviolet light sources 104. In this instance, such an ultraviolet absorbent is preferably used that selectively absorbs ultraviolet light of a wavelength range radiated from UVLED used as the ultraviolet light sources 104 but exhibits no remarkable absorption characteristics for the visible light range. Selectively absorbing ultraviolet light of a wavelength range radiated from UVLED may mean exhibiting absorption characteristics particularly for near luminous wavelength of UVLED used as the ultraviolet light sources 104. Exhibiting no remarkable absorption characteristics for the visible light range may mean substantial transparency to visible light. With the technical aspects described thus far, the ink on the medium 50 may be directly and selectively heated under ultraviolet irradiation so as to volatilize the solvent away from the ink.

As for absorption characteristics, the ultraviolet absorbent is preferably 10% or more ultraviolet absorptivity under the following conditions; ink thickness of 20 µm, and UVLED ultraviolet radiation in the wavelength range of 250 to 410 nm. The ultraviolet absorptivity under the conditions is preferably 20% or more. It is preferable that the absorption characteristics for light in the visible light range is such that a ΔE color difference in the L*a*b* color system between color tones of ink having a basic color, Y, M, C, R, G, or B (color ink), before and after adding the ultraviolet absorbent is 20 or less. The ΔE color difference generated by adding the ultraviolet absorbent is preferably 10 or less.

The ultraviolet absorbent used in this embodiment may be selected from the known ultraviolet absorbents characterized as described so far. The ink used in this embodiment may include an ultraviolet absorbent selected from, for example, benzotriazole-based ultraviolet absorbents, liquid ultraviolet absorbents, triazine-based ultraviolet absorbents, benzophenone-based ultraviolet absorbents, and benzoate-based ultraviolet absorbents.

The benzotriazole-based ultraviolet absorbent may be selected from TINUVIN P, TINUVIN 234, TINUVIN 326, TINUVIN 328, and TINUVIN 329. The liquid ultraviolet absorbent may be selected from TINUVIN 213 and TINUVIN 571. The triazine-based ultraviolet absorbent may be TINUVIN 1577 ED. The benzophenone-based ultraviolet absorbent may be selected from CHIMASSORB 81 and EVERSORB BL371. The benzoate-based ultraviolet absorbent may be TINUVIN 120.

The triazine-based ultraviolet absorbent is preferably selected from, for example, hydroxyphenyl triazine-based ultraviolet absorbents because of their suitable absorbency for ultraviolet light having a wavelength less than 360 nm. Examples of the hydroxyphenyl triazine-based ultraviolet absorbent may include TINUVIN 400, TINUVIN 405, and TINUVIN 479.

Among the mentioned examples, "TINUVIN" and "CHIMASSORB" are registered trademarks. The ultraviolet absorbents with these trademarks are manufactured and supplied by BASF Corporation. The ultraviolet absorbent, EVERSORB BL371, is manufactured and supplied by Everlight Chemical Industrial Co. (TAIWAN). One of these ultraviolet absorbents may be singly used, or two or more of them may be combined and added to the ink used in this embodiment.

The ultraviolet absorbent preferably have transmittivity of 60% or more for light in the visible light range This may allow the ultraviolet absorbent to be substantially transparent to visible light so as to minimize any color change of the ink possibly caused by adding the ultraviolet absorbent. The transmittivity of the ultraviolet absorbent to light in the visible light range is preferably 70% or more, more preferably 80% or more, and further preferably 90% or more. The ultraviolet absorbent thus characterized may be allowed to have a high degree of transparency, with less absorption of visible light. As a result, possible cloudiness and poor color brightness of the ink due to absorption of visible light may be favorably avoided.

In the ultraviolet-absorbable aqueous latex ink of this embodiment, the ultraviolet absorbent may be dissolved or dispersed in the solvent, as described earlier. The ultraviolet absorbent, instead of being directly dissolved or dispersed in the solvent, may be dissolved or dispersed in the other components of the ink. An example of the other components may be a resin component included in the ink as an ingredient. Further, a resin component is a resin included in the ink as an component. The ultraviolet absorbent may be dissolved or dispersed in a latex resin.

This embodiment may use any one selected from the organic ultraviolet absorbents mentioned earlier. For example, the resin component, after the organic ultraviolet absorbent is dissolved or dispersed therein, may be dispersed in the solvent, or the organic ultraviolet absorbent may be directly dissolved in the solvent. The ultraviolet absorbent may be selected from not only the above-mentioned ones, but also any other suitable materials. For example, the ultraviolet absorbent may be an inorganic material. For example, transparent fine particles of zinc oxide or titanium oxide may be dispersed in the solvent and added to the ink. In this instance, the resin component in which the ultraviolet absorbent has been dispersed may be dispersed in the solvent and added to the ink.

In case the principal component of the solvent is an aqueous solvent such as water or a water-soluble organic solvent, the ultraviolet absorbent may be indissoluble in the solvent. The principal component of the solvent is a component added thereto a largest content among all of the solvent components in liquid state. It is preferable that the ultraviolet absorbent, instead of being directly dissolved or dispersed in the solvent is dissolved or dispersed in the other components of the ink. For example, the ultraviolet absorbent may be granulated into fine particles and then dispersed in the solvent.

Examples of the ultraviolet-absorbable aqueous latex ink of this embodiment may include resins having water solubility such as vinyl resins, acrylic resins, alkyd resins, polyester resins, polyurethane resins, silicone reins, fluorine resins, epoxy resins, phenoxy resins, and polyolefin resins, and modified resins of these examples. Of these examples, acrylic resins, water-soluble polyurethane resins, water-soluble polyester resins, and water-soluble acrylic resins are more preferable, and acrylic resins are particularly preferable. One of these resins may be singly used, or two or more of them may be combined and added to the aqueous latex ink. The content of the resin added to the ink may be optionally decided in accordance with which one of the resins is used. For example, the resin content is preferably, to the total weight of the aqueous latex ink, greater than or equal to 1 wt. %, more preferably greater than or equal to 2 wt. %, and preferably less than or equal to 40 wt. %, more preferably less than or equal to 30 wt. %.

In this embodiment, the solvent is the principal component of the ultraviolet-absorbable aqueous latex ink. The principal component may be a component more included than any other components in terms of weight ratio. In the ink of this embodiment, the solvent is preferably a component that accounts for 50 wt. % or more to the total ink weight. Such ink may be adjusted in viscosity before ejected from the inkjet heads 102 to be suitably low for ejection in the inkjet printing. Examples of the solvent in the ultraviolet-absorbable aqueous latex ink preferably include aqueous solvents, for example, water and water-soluble organic solvents. The water-soluble organic solvent to be used may be selected from solvents conventionally used in latex inks. Specific examples of the water-soluble organic solvents used as wetting agent or anti-drying agent may be: multivalent alcohols including ethylene glycol, propylene glycol, diethylene glycol, polyethylene glycol, thioglycol, dithioglycol, 2-methyl-1,3-propane diol 1,2,6-hexanetriol, acetylene glycol derivatives, glycerin, and trimethylolpropane; lower alkyl ethers of multivalent alcohols including ethylene glycol monomethyl ether, ethylene glycol monoethyl ether, diethylene glycol monomethyl ether, diethylene glycol monoethyl ether, triethylene glycol monoethyl ether, and triethylene glycol monobutyl ether; heterocyclic compounds including 2-pyrrolidone, N-methyl-2-pyrrolidone, 1,3-dimethyl-2-imidazolidinone, and N-methyl morpholine; sulfur-containing compounds including sulfolane, dimethyl sulfoxide, and 3-sulfolene; multifunctional compounds including diacetone alcohol and diethanolamine; and urea derivatives. Examples of the water-soluble organic solvent used for viscosity adjustment may be: monovalent alcohols including methanol, ethanol, propanol, isopropanol, butanol, isobutanol, sec-butanol, t-butanol, pentanol, hexanol, cyclohexanol, and benzyl alcohol; multivalent alcohols including ethylene glycol, diethylene glycol, polyethylene glycol, propylene glycol, dipropylene glycol, triethylene glycol, polyethylene glycol, butylene glycol, hexanediol, pentanediol, glycerin, hexanetriol, and thiodiglycol; glycol derivatives including ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol acetate, ethylene glycol monomethyl ether acetate, triethylene glycol monomethyl ether, triethylene glycol monoethyl ether, and ethylene glycol monophenyl ether; amines including ethanolamine, diethanolamine, triethanolamine, N-methyl diethanolamine, N-ethyl diethanolamine, morpholine, N-ethylmorpholine, ethylenediamine, diethylenetriamine, triethylenetetramine, polyethyleneimine, and tetramethyl propylenediamine; formamide; N,N-dimethyl formamide; N,N-dimethylacetamide; dimethyl sulfoxide; sulfolane; 2-pyrrolidone; N-methyl-2-pyrrolidone; N-vinyl-2-pyrrolidone; 2-oxazolidone, 1,3-dimethyl-2-imidazolidinone; acetonitrile; and acetone. It is preferable to use a water-soluble organic solvent that is safe and hardly harmful to human body. Specific examples of such a water-soluble organic solvent may include isoparaffin-based solvents, ethylene glycol monobutyl ether acetate (BMGAC), ethylene glycol monopropyl ether, diethylene glycol monobutyl ether (BDG), diethylene glycol ethyl methyl ether (EDM), diethylene glycol diethyl ether (EDE), propylene glycol monomethyl ether acetate (PMA), dipropylene glycol monomethyl ether (DPGME), dipropylene glycol dimethyl ether, butyl acetate, and 3-methoxy butyl acetate. One of these examples may be singly used, or two or more of them may be combined and used. The water-soluble organic solvent included in the ultraviolet-absorbable aqueous latex ink of this embodiment preferably have a boiling point higher than or equal to 100° C., more preferably have a boiling point higher than or equal to 110° C. The organic solvent is preferably multivalent alcohols including glycerin and diethylene glycol, because they have good compatibility with water and allow anti-dryness and viscosity adjustment to be both feasible at the same time.

The ultraviolet-absorbable aqueous latex ink according to this embodiment may be curable by drying or heating. The ultraviolet-absorbable aqueous latex ink according to this embodiment may further contain an emulsifier that emulsifies or suspends the resin. In addition to the emulsified or suspended resin, another resin may be dissolved in the solvent of the ultraviolet-absorbable aqueous latex ink according to this embodiment. The another resin dissolved in the solvent may be added to adjust the viscosity of the ink When the solvent is evaporated by drying, the resin emulsified or suspended in the solvent are bonded to form a film. At the time, the another resin may serve as a binder that strengthens the bond between the emulsified or suspended resin. The solvent may further contain a thickener, a dispersant, a surfactant, and/or a leveling agent.

By using the ultraviolet-absorbable aqueous latex ink thus characterized, the aqueous solvent, which is the principal component, may be evaporated by ultraviolet light from the ink that landed on the medium 50 so as to effectively prevent the ink from bleeding on the medium. The ink, from which the aqueous solvent has been thus evaporated, may be suitably fixed to the medium 50 (dried and fixed).

Because the ultraviolet-absorbable aqueous latex ink may be dried in short time the ultraviolet irradiation, inks and mediums 50 of different types that can hardly be paired in the known art may be combined and used for printing. Specifically, various types of latex inks may be used with, for example, a paper medium 50 with no ink receiving layer formed thereon or a fabric medium 50 subjected to no pretreatment. This may lead to significant reduction of running costs of printing.

For example, fabrics, porous mediums, and mediums made of non-permeable PET and PC (polycarbonate) may be difficult to use in the known art in combination with the conventional latex inks due to, for example, a very high risk of ink bleeding. Such mediums 50 may be used with the latex inks by adding the ultraviolet absorbent described thus far to the latex inks and heating the resulting inks using ultraviolet light. In this embodiment, therefore, various latex inks having different features may be used with a broad range of different mediums 50, as compared with the known art.

The ultraviolet-absorbable aqueous latex ink used in this embodiment contains a colorant to produce color. While the ink colors are not particularly limited, this embodiment uses, for example, ultraviolet-absorbable aqueous latex inks of YMCK colors characterized as described earlier. It is preferable that any other color inks, if additionally used in the printing apparatus 10, may desirably have the same composition. Examples of the additional color inks may include white, clear-color, red (R), green (G), blue (B), and orange (Org) inks.

The ultraviolet absorbent-containing ink conventionally often used may be monomer-containing inks curable under ultraviolet irradiation (UV ink). However, the ink according to this embodiment is distinct from such an ultraviolet-curable ink. The ultraviolet absorbent added to the ink of this embodiment may be an ultraviolet absorbent identical or similar to the ones used in the conventional ultraviolet-curable inks.

Comparing the ultraviolet-absorbable aqueous latex ink of this embodiment with any known ultraviolet-curable ink, there is a distinct difference in terms of events produced by having the ultraviolet absorbent absorb ultraviolet light. In the known ultraviolet-curable inks, monomers, for example, are polymerized under ultraviolet irradiation, so that the ink is cured through the reaction and fixed to the medium. In this instance, it is a chemical event that is triggered by the ultraviolet irradiation.

On the other hand, this embodiment evaporates the aqueous solvent in the ink, instead of curing the ink through polymerization, so that the ink is fixed to the medium (dried and fixed). In this embodiment, therefore, the ultraviolet absorbent serves as a heat source that generates heat in response to ultraviolet light. The ultraviolet-induced event is thus a physical event, which is totally different to the ultraviolet-curable ink. The ultraviolet absorbent used in the ink of this embodiment includes no material that triggers the polymerization of monomer or oligomer in response to ultraviolet light (UV curing initiator or UV polymerization initiator).

The mechanism of ultraviolet irradiation using the ultraviolet light sources 104 is hereinafter described in further detail. Known examples of the ultraviolet light source may include ultraviolet lamps, other than semiconductor light sources such as UVLED and ultraviolet LD. Theoretically, an ultraviolet lamp may be usable as the ultraviolet light source 104 instead of the semiconductor light source.

However, high-speed ON/OFF is not possible with the ultraviolet lamp, unlike the semiconductor light sources. Another issue with the ultraviolet lamps may be a greater area heated at once than UVLED. The Ultraviolet lamp, if used as the ultraviolet light source 104 at a high temperature so as to volatilize and remove the solvent in short time, may easily boil the ink and cause the ink surface to become uneven, losing the surface glossiness of a printed matter. Moreover, the ultraviolet lamp may be difficult to use with any poorly heat-resistant mediums 50 and may discolor or burn the ink and/or the medium 50.

The ultraviolet lamp typically has poor conversion efficiency for ultraviolet light, and light from the ultraviolet lamp may abundantly include visible light ineffective for heating. The ultraviolet lamp may fail to selectively heat the ink alone, possibly heating the medium 50 and other elements nearby, as well as the ink. Most of energy supplied to the ultraviolet lamp may be converted into heat and dissipated through the medium 50. Such energy loss when the ink is dried may result in poor efficiency of energy use.

As described earlier, a suitable example of the ultraviolet light source 104 is preferably that a semiconductor light source such as UVLED because of efficient ultraviolet radiation within a specific wavelength range. By using the ultraviolet-absorbable aqueous latex ink containing an ultraviolet absorbent suitable for a wavelength range of ultraviolet light, heating efficiency may improve, while reducing adverse impacts on the medium 50 and surface properties of the ink. As a result, the occurrence of ink bleeding and loss of glossiness may be successfully prevented.

The ultraviolet irradiation intensity from UVLED has been significantly improving in tandem with the advancement of technology in recent years (for example, in the last five years), which provides improved accessibility to an irradiation intensity required to volatilize and remove the solvent from the ink. This is another reason why a UVLED-equipped ultraviolet light source is preferably used. High-speed ON/OFF control is possible with the semiconductor ultraviolet light sources, unlike the ultraviolet lamps. The UVLED-equipped ultraviolet light sources 104, therefore, may be swiftly turned on and off as required.

The ink on the medium 50 is preferably heated at once in short time by the ultraviolet light sources 104. The ultraviolet light sources 104 preferably radiate ultraviolet light in a manner that continuous irradiation time for the same position on the medium 50 is less than the thermal time constant of heat dissipation from the medium 50. The ink solvent is preferably heated under such ultraviolet irradiation over such continuous irradiation time so that the temperature of the ink solvent does not reach its boiling point at the position of ultraviolet irradiation. The boiling pint of the ink solvent may be the boiling point of the aqueous solvent added to the ink as its principal component.

By heating the ink to a temperature lower than the solvent's boiling point and high enough to volatilize and remove the aqueous solvent in the ink to an extent that the ink bleeding is preventable, the ink may be preventing from boiling and becoming uneven on its surface. As a result, the ink solvent may be instantly evaporated and thereby prevented from bleeding, and sufficient glossiness may be imparted to the surface of a printed matter. Further, the ink may be prevented from bleeding not only in a direction along the surface of the medium 50 but also in a direction along the thickness of the medium 50. As described earlier, the ink may be accordingly increased in viscosity before a large portion of the ink is absorbed into the medium 50, and unabsorbed ink may be abundantly left on the surface of the medium 50. When a permeable medium is used as the medium 50, color and black-and-white images may be both printed at higher concentrations, and a clear and glossy print result may be accordingly obtained.

Hereinafter, heat dissipation from the medium 50 during heating is described in further detail. When the ultraviolet-absorbable aqueous latex ink is irradiated with ultraviolet light and thereby heated, there are factors that need to be considered, for example, quantity of heat lost through the medium 50, and thermal energy loss. When the intensity of ultraviolet radiation from the ultraviolet light sources 104 is relatively low, desirably high temperatures may be difficult to reach due to heat dissipation through the medium 50, possibly resulting in failure to prevent the ink bleeding.

To reduce any impacts from the quantity of heat dissipating through the medium 50 (for example, temperature drop) and thermal energy loss, intense ultraviolet light is preferably radiated to an extent that overheating is avoidable not to burn the ink or the medium 50 or not to boil the ink to prevent the surface of a printed matter from becoming matte, so that such a temperature is reached in short time that is lower than the boiling point of the principal component of the ink solvent and high enough to volatilize the solvent away from the ink to an extent that the ink bleeding is preventable. In this instance, continuous irradiation time of ultraviolet light is preferably adequately shorter than the thermal time constant r of heat dissipation through the medium 50, as described earlier. This configuration may allow such a temperature to be reached in short time that is lower than the boiling point of the principal component of the ink solvent and high enough to volatilize the solvent away from the ink to an extent that the ink bleeding is preventable.

The rate of transmission of heat dissipating through the medium 50 is decided by the thermal time constant $\tau$ calculated in the following formula.

$$\tau(\text{thermal time constant}) = \text{thermal capacity} \times \text{thermal resistance} = \text{thermal capacity} \times \text{thickness}/\text{thermal conductivity}$$

When the ink is irradiated with intense ultraviolet light in shorter time than the thermal time constant $\tau$ of the medium 50, the ink may be adiabatically heated, which may reduce heat loss. The thermal time constant $\tau$ of the medium 50 may be variable with the material and thickness of the medium 50.

FIG. 4 is provided to describe the thermal time constant z of the medium 50 in further detail. This drawing shows a result of calculated thermal time constant obtained with a medium 50 made of polyvinyl chloride (polyvinyl chloride sheet). The thermal time constant $\tau$ of the medium 50 may be calculated as illustrated in FIG. 4. In the illustrated example, the thermal time constant is 9.18 seconds. Thus, the thermal time constant of a regular polyvinyl chloride film approximately 1 mm in thickness may be nearly 10 seconds.

The thermal time constant may be estimated to be substantially equal among many mediums 50 of other types (for example, mediums made of various plastic materials). The thermal time constant is a few seconds or more in the conventional plastic mediums (for example, approximately five seconds or more). Therefore, the continuous irradiation time of the ultraviolet light sources 104 is preferably three seconds or less, more preferably 0.2 seconds or less.

The inventors of this disclosure learnt through the tests that an ink layer on the medium 50 alone may be efficiently heated to high temperatures by thus setting the continuous irradiation time of ultraviolet light. They also learnt of improved heating efficiency with continuous irradiation time of 0.1 seconds or less.

In the printing apparatus 10 configured as described in this embodiment, the ultraviolet light sources 104 are moved during main scans at the same moving speed as the inkjet heads 102. The duration of heating using ultraviolet light (continuous irradiation time) may be adjusted by adjusting the width of the ultraviolet light source 104, 104 in the main scanning direction. The moving speed of the inkjet heads 102 during main scans is usually approximately 500 to 1,000 mm/s. When the width of the ultraviolet light source 104, 104 in the main scanning direction is set to approximately 50 mm, the continuous irradiation time for the same region on the medium 50 is 50/(500 to 1,000)=approximately 0.1 to 0.05 seconds. In this manner, the continuous irradiation time may be appropriately decided and set.

The ink heating temperature may be adjusted by changing the irradiation intensity of the ultraviolet light source 104. As a result, the solvent may be appropriately and sufficiently volatilized away from the ink within the preset continuous irradiation time. By moving the ultraviolet light sources 104 during the heating, short-time heating using powerful ultraviolet light may be feasible at different positions on the medium 50, while preventing overheating not to burn the ink and/or the medium 50 or not to boil the ink to prevent the surface of a printed matter from becoming matte.

If powerful ultraviolet light is used over longer continuous irradiation time, unlike this embodiment, the medium 50 may burn and/or the ink may boil and become uneven on its surface, resulting in a printed matter with a matte surface. To avoid that, weak ultraviolet light may have to be used not to burn the medium 50 or not to boil the ink when the continuous ultraviolet irradiation is performed over an extended period of time. In that case, however, most of heat generated by ultraviolet irradiation may dissipate through the medium 50, failing to increase the ink temperature. Then, it is not possible to adequately volatilize the solvent away from the ink using ultraviolet light, and the occurrence of ink bleeding may consequently fail to be prevented. According to this embodiment, powerful ultraviolet light may be radiated in short time through main scans, and the ink may be adequately heated in a manner that the ink is not boiled or the medium 50 is not burnt.

The irradiation intensity (energy required of the ultraviolet light sources 104) necessary for heating the ink (constant-rate heating of ink layer), and heat loss through the medium may be calculated as described below. The irradiation intensity (energy) necessary for heating the ink may be expressed by the formula (1), $$\alpha Ei=(10 \times D \times 4.2)(\text{Joule}) \quad (1),$$

where D (cm) is the thickness of ink on the medium 50, $\alpha$ is the absorptivity of ultraviolet light into ink, 4.2 (Joule/gr) is the specific heat of ink, and Ei is an irradiation energy required for 10° C. increase of the temperature of an ink layer having the area of 1 cm² and thickness of D (cm). When D (=20 μm)=0.002 cm, $$Ei \approx 0.083/\alpha (\text{Joule/cm}^2) \quad \text{formula (2).}$$

When the continuous irradiation time using UVLED as the ultraviolet light sources 104 is one second and $\alpha$=0.5, the irradiation intensity required of UVLED is expressed by the formula (3), $$0.166(W/\text{cm}^2) \quad (3).$$

As for the quantity of heat dissipating from the medium (amount of heat loss energy), energy loss E1 per second (Joule/sec) through the medium 50 in the area of 1 cm² (per 1 cm²) may be roughly calculated by the formula (4), $$E1=(0.25 \times 10 \times 0.0001/0.001)=0.25(W)(\text{Joule/sec}) \quad (4)$$

provided that the thermal conductivity is 0.25 (W/mK), the thickness of the medium 50 is 1 mm, and the temperature difference between front and back surfaces of the medium 50 is 10° C.

The energy loss E1 may be rephrased as heat loss during constant-rate heating in which the medium 50 is heated at a slow pace. It is known from comparison of the formulas (3) and (4) that more energy than required of heating the ink layer is lost through the medium 50 during slow-paced heating under general equilibrium conditions.

These formulas may teach that an effective means to avoid such energy loss is fast-paced heating by radiating powerful ultraviolet light from the ultraviolet light sources 104 over continuous irradiation time shorter than the thermal time constant (=thermal capacity×thermal resistance) of the medium 50. Under conditions set for short-time heating with less heat loss, efficient heating may be feasible by feeding a relatively small amount of energy approximate to the energy calculated by the formula (1). In this instance, the solvent included in the ink may be evaporated at an accelerating pace by rapidly heating the ink to a temperature lower than the solvent's boiling point and high enough to volatilize and remove the solvent in the ink to an extent that the ink bleeding is preventable. Yet, there is an upper limit to the rate of heating, which demands a range of temperatures low enough not to burn the medium 50 in contact with the ink or not to boil the ink to prevent the surface of a printed matter from losing glossiness.

The inventors of this disclosure conducted tests using aqueous latex inks respectively containing known ultraviolet absorbents of different types in combination with the conventional UVLEDs. Through the tests, the risk of ink bleeding was found to be controllable under ultraviolet irradiation of various intensities with continuous irradiation time of 2 seconds to 0.1 seconds or less. Further, such conditions were found to be feasible that can prevent the ink and the medium 50 from being overheated and burnt and that can prevent the ink from boiling not to cause the surface of a printed matter to become matte. Further, a preferred range of intensities of ultraviolet light radiated from the ultraviolet light sources 104 was also learnt from the tests, which was at least 0.3 W/cm² or more. More specifically, the ultraviolet irradiation intensity is preferably greater than or equal to 0.5 W/cm², more preferably greater than or equal to 1 W/cm², and further preferably greater than or equal to 5 W/cm². The inventors further conducted tests and discussed optimal conditions, which taught them that types of the ultraviolet absorbent and UVLED to be used are not necessarily limited but are optional.

In the tests, the inventors also checked temperature changes of the ultraviolet absorbent-containing ink irradiated with ultraviolet light from UVLED. Through the tests, the inventors were led to the following facts; the ink was suitably fixed to the medium 50 with a reduced risk of causing the ink surface to become uneven when heated to approximately 70° C. or more not to boil the ink, the ink was burnt at very high temperatures (for example, temperatures over approximately 400° C.), and the ink was likely to burn when the ultraviolet irradiation intensity was greater than or equal to approximately 1 W/cm² and the continuous irradiation time was longer than the thermal time constant of the medium 50.

To suppress the risk of ink bleeding, the ink may need to be irradiated with ultraviolet light under the described conditions over a predetermined period of time before the ink starts to bleed. The predetermined period of time may be decided in accordance with the medium 50 used and the rate of ink bleeding that depends on such factors as ink viscosity and surface tension. For example, ultraviolet radiation preferably start within approximately 0.05 to 2 seconds after the ink droplets landed on the medium. The duration of time before ultraviolet radiation starts may be set by adjusting a distance between the inkjet heads 102 and the ultraviolet light sources 104 in accordance with, for example, the moving speed of the inkjet heads 102 during main scans.

Next, modified examples and preferred exemplified applications of the printing apparatus 10 according to this embodiment are hereinafter described. The description hereinafter given may include some of the matters already described earlier.

In the description so far, permeable mediums on which ink is likely to bleed, for example, paper and fabric (for example, sewn products such as T-shirts), are used as the medium 50 of the printing apparatus 10. This embodiment may offer a distinguished bleeding-preventive effect in high-speed printing using such permeable mediums with a higher risk of ink bleeding.

In the printing apparatus 10, the medium 50 may be selected from permeable mediums and also from a variety of other types of mediums including non-permeable mediums, and fast drying means may effectively avoid the occurrence of ink bleeding when any one of such mediums is used. Specifically, the medium 50 used in the printing apparatus 10 may be selected from porous mediums, non-permeable plastic films (for example, PET), polyvinyl chloride sheets, polycarbonate mediums, and the like. While some mediums may be unsuitable for use in the conventional printing apparatuses because of a high risk of ink bleeding, high-resolution color print results that excel in glossiness may be obtained with such conventionally unsuitable mediums by employing fast drying means to prevent the ink bleeding while heating the ink to an adequate temperature not to cause the surface of a printed matter to become matte.

In this embodiment that may prevent the occurrence of ink bleeding without compromising the surface glossiness of a printed matter without subjecting the medium 50 to any pretreatment, clear, high-quality print results may be obtained with, for example, paper products having no ink receiving layer formed thereon, and fabrics and fabric products (sewn products) subjected to no pretreatment. As a result, printing costs may be suitably reduced. In this embodiment, the medium 50 may be thus selected from a broad range of mediums including permeable mediums with no ink receiving layer formed thereon (for example, paper, fabric) and non-permeable (non-absorbable) mediums (for example, coating-less mediums). The medium 50 may be selected from mediums having an ink receiving layer formed thereon.

The printing apparatus 10 illustrated in FIGS. 1A and 1B performs bidirectional main scans. In a modified example, the printing apparatus 10 may perform main scans in one direction (unidirectional printing), in which case the ultraviolet light sources 104 may be disposed on one side alone of the inkjet heads 102, i.e., at a position behind the inkjet heads 102, during main scans.

The specific features of the printing apparatus 10 may be modified otherwise in various manners. The colors of the inks used in the inkjet heads 102 (color inks) are not necessarily limited to any particular colors. In the inkjet heads 102, other feature colors may be used instead of YMC colors, for example, Y, M, C, R, G, and B, white, pearl, metallic, fluorescent, and phosphorescent colors. The number of such feature colors is not particularly limited and may be one or more.

The printing apparatus 10 may be configured as, for example, a line printer instead of a serial printer that performs main scans, insofar as the ink that landed on the medium 50 can be irradiated with ultraviolet light. In this instance, the ultraviolet light sources 104 (for example, ultraviolet LED apparatus) may be disposed more downstream than the inkjet heads 102 in the transport direction of the medium 50. In the printing apparatus 10 configured as a line printer, the ultraviolet light sources 104 may be separately or collectively disposed on the downstream side correspondingly to the ink colors.

In the printing apparatus 10 configured as a serial printer, the ultraviolet light sources 104 may be disposed at any positions but positions adjacent to (for example, on both sides of) the inkjet heads 102 in the main scanning direction. For example, the ultraviolet light sources 104 may be disposed at positions more downstream than the inkjet heads 102 in the transport direction of the medium 50. The ultraviolet light sources 104 may be disposed at a position adjacent to the inkjet heads 102 in the main scanning direction and at a position more downstream than the inkjet heads 102 in the transport direction. In the printing apparatus 10 thus structured, the ultraviolet light source 104 positioned more downstream than the inkjet heads 102 in the transport direction may function as an after-heating ultraviolet light source.

As described earlier, the energy of ultraviolet radiation from the ultraviolet light sources 104 (largest irradiation energy supplied) depends on the irradiation intensity and irradiation time of ultraviolet light from the ultraviolet light sources 104. The largest irradiation energy supplied may need to be set within such a range that can prevent the medium 50 and the ink thereon from being burnt or the like. In order to set the largest irradiation energy supplied to stay within an optimal range, at least one of the irradiation intensity and irradiation time of ultraviolet light from the ultraviolet light sources 104 may be automatically changed or manually changed by an operator based on at least one of the printing speed, number of print passes, and density of ink dots formed on the medium 50 (printing dot density).

In this embodiment, the ultraviolet light sources 104 irradiate the ink layer on the medium 50 with ultraviolet light, while moving with the inkjet heads 102 during main scans. The amount of ultraviolet radiation from the ultraviolet light sources 104 toward the ink layer may desirably be uniform within at least a range of widths of ejection in an equal length of time. This may mean that the amount of ultraviolet radiation is desirably uniform within a range of widths in which the ink droplets are ejected from one inkjet head 102 in at least one main scan (widths of ejection in the same pass).

As described earlier, the ultraviolet light sources 104 are not necessarily limited to UVLED but are selectable from laser light sources including semiconductor lasers (ultraviolet LD). When the source of ultraviolet light is a laser light source, a beam expander or a cylindrical lens may be used so as to uniformly irradiate a certain area with ultraviolet light. In this instance, light beam may be expanded in the direction of nozzle arrays of the inkjet heads 102, while the light beam is focused on a certain region in one direction included in the moving direction of the inkjet heads 102 (main scanning direction). This may allow ultraviolet light to be uniformly and adequately radiated toward a certain area.

The directivity of ultraviolet light radiated from the ultraviolet light sources 104 may desirably be set such that ultraviolet light neither arrives at nozzle surfaces of the inkjet heads 102 nor heats any ink left in the nozzles. More specifically, the directivity of ultraviolet light radiated from the ultraviolet light sources 104 may be set such that ultraviolet light is not directed toward the inkjet heads 102. The directivity of ultraviolet light may also be set such that ultraviolet light reflected from the medium 50 and directed toward the inkjet heads 102 (reflective component) is adequately reduced.

During main scans, the ultraviolet light sources 104 move with the inkjet heads 102 in the main scanning direction, while continuing to radiate ultraviolet light (continuous lighting control). Instead of the continuous lighting control, pulse lighting may be employed for the ultraviolet light sources 104.

The inkjet heads 102 that eject ink droplets of different colors (for example, inkjet heads 102 for each YMCK colors) described so far are arranged in the main scanning direction with their positions in the sub scanning direction aligned with one another. The inkjet heads 102 may be arranged otherwise in various manners. For example, some of the inkjet heads 102 may be displaced from the other inkjet heads 102 in the sub scanning direction. Specifically, the inkjet heads 102 for part of the YMCK colors (one or more colors) may be aligned on Y axis, while the inkjet heads 102 for the other color(s) (one or more colors) may be dispersedly arranged in the direction of X axis. The inkjet heads 102 being aligned on the Y axis may be specifically the inkjet heads 102 being arranged in the main scanning direction with their positions in the sub scanning direction aligned with one another. The inkjet heads 102 being dispersedly arranged in the direction of X axis may be specifically the inkjet heads 102 being arranged with their positions displaced from one another in the sub scanning direction. This may adequately decrease the amount of inks ejected to the same region in each main scan and thereby more effectively suppress the risk of ink bleeding.

In the description so far, the ink droplets are directly ejected to the medium 50, a print target, which will directly become a final product when the printing is completed. In a modified example of the printing apparatus 10, the medium used may be a transfer medium. The transfer medium may be a medium from which an image printed thereon will be transferred to another medium.

An exemplified application is hereinafter described that uses the ultraviolet absorbent-containing aqueous latex ink described earlier. As described earlier, such ultraviolet absorbent-containing aqueous latex ink may be rapidly dried without causing the surface of a printed matter to become matte by heating under ultraviolet irradiation at a temperature low enough not to boil the ink. When a permeable medium, such as fabric, is used, the ink may be less likely to penetrate into the medium or may be prevented from bleeding on the medium without compromising the surface glossiness of a printed matter. Such ink, therefore, may be suitably used in any printing apparatuses that use fabric mediums (textile printers). For example, a printing apparatus equipped to print high-resolution images or patterns on both surfaces of fabric mediums (textile printer adapted for fast heating, high-resolution duplex printing) may be feasible by fully utilizing the fast drying means. Such printing means for both surfaces of a fabric medium is hereinafter described in further detail.

In a printing operation using a conventional ink and a fabric medium, a large portion of the ink may penetrate into the medium, as described referring to FIGS. 2A and 2B. In duplex printing, more solvent may penetrate into the medium, increasing the risk of ink bleeding. The fabric absorbing the solvent may be swollen and deformed (stretched), which makes the medium difficult to maintain precision in size. Faced with such unsolved problems, the known inkjet printing apparatuses using fabric mediums (known digital textile printers) conventionally perform printing for one of surfaces alone of fabric mediums.

While the conventional printing apparatuses may be theoretically usable for duplex printing with fabric mediums, printing images/patterns on two surfaces of the medium at a short time interval may increase the likelihood of ink bleeding. This means that a medium, after an image/pattern is printed on one of its front and back surfaces, may need to be dried over long time by an additional heating means before printing for the other surface starts. This may be a bottleneck in downsizing of and higher printing speeds in the conventional printing apparatuses, eventually making the conventional printing apparatuses practically unusable for duplex printing with fabric mediums.

One-sided printing with fabric mediums may fail to meet a product quality that may be required of luxury products. Specifically, in one-sided printing, a surface opposite to a pattern/image-printed surface is blank, showing its ground color. Such a printed matter may be unsuitable for products often seen from both sides, such as scarves, handkerchiefs, curtains, short curtains for store entrances, and fabrics for clothes, and may fail to satisfy degrees of quality particularly demanded in luxury products. Therefore, improved inkjet printing (digital textile printing) is desirably developed in the field of expensive, originally-designed fashion items required to satisfy the customers' individual needs.

When a fabric medium is used for one-sided printing and the printed medium is washed, for example, the fiber texture of the medium may not remain the same, and the blank backing fabric of the medium may be visible on the outer side, which may weaken the color of a printed pattern. Then, apparent fastness to wash and fastness to moisture may be significantly degraded, which is an additional factor that demands improvement of printing performance with fabric mediums.

The inventors of this disclosure came up with the idea of irradiating the ultraviolet absorbent-containing aqueous latex ink with ultraviolet light so as to rapidly dry the ink at a temperature low enough not to boil the ink, which was found to be an effective means, particularly with fabric mediums, that may prevent abundant ink from penetrating into the mediums without compromising the surface glossiness of a printed matter and that may lead to successful duplex printing using fabric mediums. Through further studies, the inventors finally determined desirable ink compositions and features of the printing apparatus 10 suitable for duplex printing using fabric mediums. The exemplified inks and features of the printing apparatus 10 for duplex printing using fabric mediums are hereinafter described in further detail. The description starts with examples of ink usable in fabric medium-used duplex printing.

Inkjet printing using aqueous pigment inks was applied to and is conventionally used in printing apparatuses for fabric mediums such as T-shirts (textile printers), in which, the fabric mediums may be directly used without any pretreatment. The only aftertreatment required of an obtained printed matter is heating to dry the ink. Such inkjet printing technique using aqueous pigment inks (digital textile printing) and fabric mediums is expected to become more popular in the future.

When a fabric medium is used in the known art, as described earlier, abundant ink may penetrate into the fabric, which may result in difficulty of high-quality duplex printing and lack of clarity in a print result due to paucity of the ink remaining on the medium surface. If the ink is heated at high temperatures in an attempt to address such issues, the ink may boil and accordingly have an uneven surface. Then, the surface of an obtained printed matter may become matte, losing glossiness.

Examples of the ultraviolet absorbent-containing absorbent latex ink may include aqueous latex inks containing pigments as colorant, as described earlier. When such an aqueous latex ink is rapidly dried under ultraviolet irradiation at temperatures lower than the boiling point of the ink, an obtained printed matter may have a glossy surface, and penetration of too much ink into the medium and the occurrence of ink bleeding may be successfully avoidable. Therefore, high-quality duplex printing may be feasible with fabric mediums. Such inks may facilitate fabric medium-used duplex printing that can obtain a print result rich in color that excels in fastness to wash, substantially without subjecting the fabric mediums to any pretreatment.

In the ink having such a composition, the ultraviolet absorbent generates heat when the ink is irradiated with ultraviolet light, and the generated heat rapidly dries the ink. The content of the ultraviolet absorbent in the ink may be approximately 0.5 to 10 wt. %.

The pigment of the ink may be selected from the known pigments. The pigment may be a colorant that does not require any special coloring treatment after the ink landed on the medium. The special coloring treatment may be any treatment but heating to evaporate the ink solvent. The pigment may be a colorant exhibiting a color desirably obtained after the printing is over.

Examples of the colorant may include self-color developing pigments that develop colors in the absence of auxiliary agents (for example, inorganic and organic pigments). The pigment may be selected from colored resins, examples of which may be aqueous latex resins colored with dyes (aqueous latex pigments for textile printing) and aqueous latex resins colored with disperse dyes.

A possible example of the ink colorant may be a colorant that develops color only when heated to evaporate the solvent. Examples of such colorants may include dispersing (fast-drying) dyes that require heating alone to develop colors. Possible examples of colorants used with polyester fabric, nylon fabric, or blended fabric primarily consisting of polyester or nylon may include sublimation dyes.

Figure 5A:
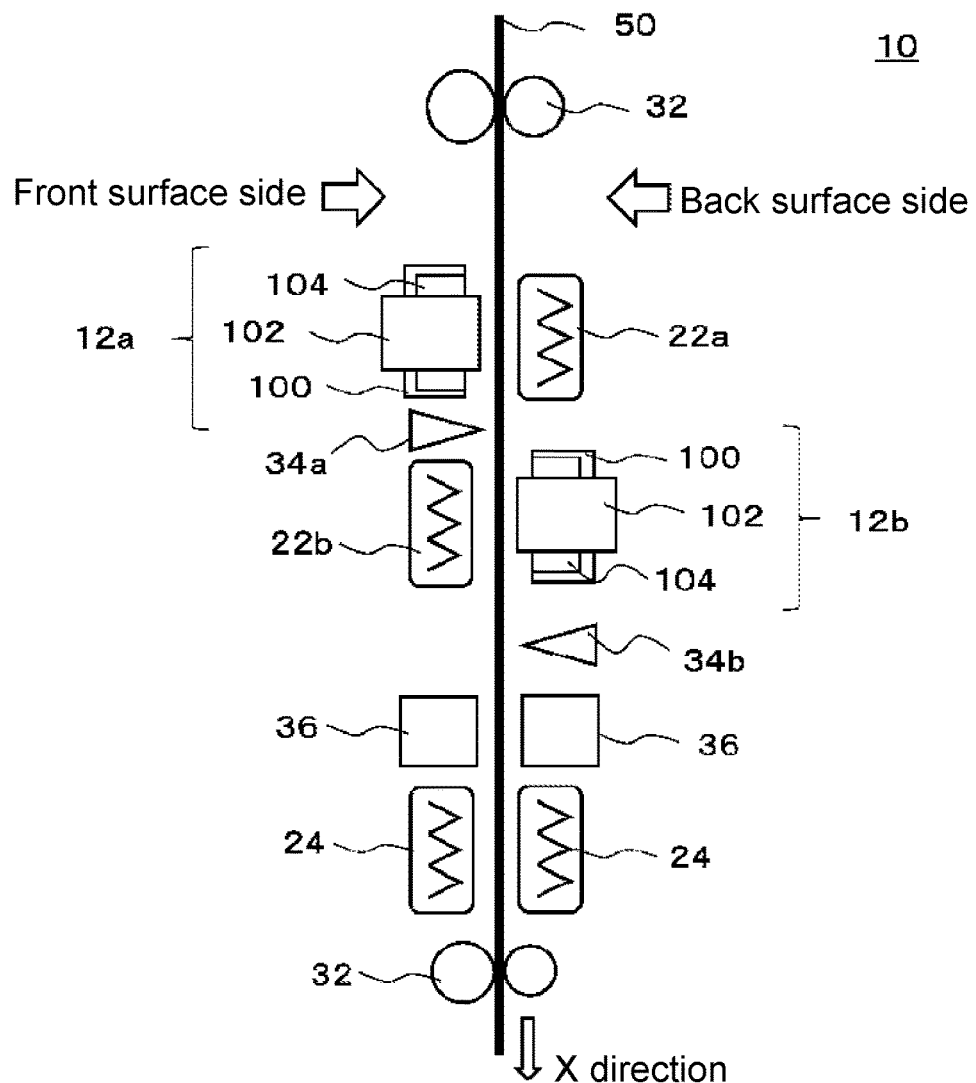
FIGS. 5A and 5B are drawings that illustrate a modified example of the printing apparatus 10.
Figure 5B:
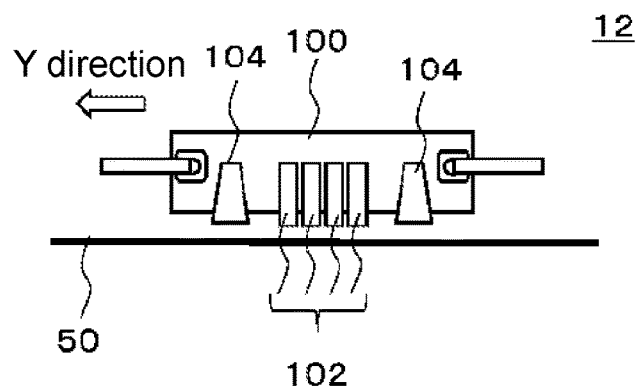

For duplex printing using fabric mediums, the printing apparatus 10 may be reconfigured and adapted for duplex printing. FIGS. 5A and 5B are drawings that illustrate a modified example of the printing apparatus 10. FIG. 5A is a drawing that illustrates an example of the printing apparatus 10 adapted for duplex printing using the fabric medium 50. FIG. 5B is a drawing of a head portion in the printing apparatus 10, illustrating an example of the head portion viewed in the moving direction of the inkjet head (Y direction) during main scans.

Except for the additional features described below, the structural elements illustrated in FIGS. 5A and 5B with the same reference signs as FIGS. 1A to 4 may be identical or similar to the ones illustrated in FIGS. 1A to 4. In this modified example, the printing apparatus 10 performs duplex printing for the fabric medium 50 subjected to no bleeding-preventive pretreatment (medium 50 with no coating thereon). Exemplified materials of the fabric medium 50 may include cotton fabrics, blended fabrics of cotton and chemical fiber yarns such as polyester and rayon, silk, wool, polyester, and Tetron fabrics.

In this modified example, the printing apparatus 10 is an inkjet printer adapted for duplex printing using fabric mediums (duplex textile printer). The structural elements of this printer include a plurality of transport rollers 32, head portions 12a and 12b, printing heaters 22a and 22b, position detectors 34a and 34b, after-heating UV irradiators 36, and after-heater 24. The transport rollers 32 transport the medium 50 to and from different positions on the transport path of the medium 50 in a predetermined sub scanning direction (X direction).

The head portions 12a and 12b are in charge of ejecting ink droplets and irradiating the ejected ink droplets with ultraviolet light. In this modified example, the head portions 12a and 12b are identically structured and respectively disposed on the front surface side and back surface side of the medium 50. The head portion 12a is disposed so as to face the front surface of the medium 50 along the transport path of the medium 50. The head portion 12a has inkjet heads that eject ink droplets to the front surface of the medium 50 (front-surface inkjet head) and ultraviolet light sources (front-surface UVLED fast drying means). The head portion 12b is disposed so as to face the back surface of the medium 50 along the transport path of the medium 50. The head portion 12b has inkjet heads that eject ink droplets to the back surface of the medium 50 (back-surface inkjet head) and ultraviolet light sources (back-surface UVLED fast drying means).

In this modified example, the head portions 12a and 12b each have a carriage 100, a plurality of inkjet heads 102, and a plurality of ultraviolet light sources 104, as in the head portion 12 illustrated in FIG. 5B. The carriage 100 is a holder for holding the inkjet heads 102 and the ultraviolet light sources 104.

The inkjet heads 102 eject ink droplets of different colors for printing. The inkjet heads 102 each have a nozzle array parallel to the sub scanning direction and are arranged next to each other in a main scanning direction (Y direction) orthogonal to the sub scanning direction. The inkjet heads 102 are, for example, inkjet heads for each YMCK colors. In this modified example, inks ejected from the inkjet heads 102 are each ultraviolet-absorbable aqueous latex ink. This ink is irradiated with ultraviolet light from the ultraviolet light sources 104 immediately after landing on the medium 50 and is thereby rapidly heated and dried under conditions set to prevent the ink from boiling.

The ultraviolet light sources 104 irradiate the ink that landed on the medium 50 with ultraviolet light. The ultraviolet light sources 104 are respectively disposed on one side and on the other side of the head portion 12 in the main scanning direction, so that the inkjet heads 102 are interposed between these light sources. During main scans, the ultraviolet light sources 104 are respectively located ahead of and behind the inkjet heads 102.

In this modified example, the head portion 12 is allowed to perform bidirectional main scans in the same manner or similarly to the head portion 12 of the printing apparatus 10 illustrated in FIGS. 1A and 1B. In case the head portion 12 is configured to perform unidirectional main scans, the ultraviolet light source 104 may be disposed on one side alone of the head portion 12 in the main scanning direction.

In the printing apparatus 10 thus characterized, the inkjet heads of the head portions 12a and 12b can be disposed on both sides of the medium 50, so that the medium 50 is interposed between these head portions. Thus, duplex printing for both surfaces of the medium 50 may be feasible with one printing apparatus. The head portions 12a and 12b are displaced from each other in the transport direction of the medium 50 (X direction) so as to avoid any overlap in position between nozzle arrays of the front-surface inkjet heads 102 and of the back-surface inkjet heads 102. The head portion 12b may be displaced from the head portion 12a in the sub scanning direction by at least a distance greater than or equal to the width of a nozzle array of the inkjet head 102 in the head portion 12a (length in the sub scanning direction). In this modified example, the head portions 12a and 12b are displaced from each other by disposing the head portion 12a on the upstream side in the transport direction and disposing the head portion 12b on the downstream side in the same direction.

The printing heater 22a heats the medium 50 at a position opposite to the head portion 12a across the medium 50. The printing heater 22b heats the medium 50 at a position opposite to the head portion 12b across the medium 50. The printing heaters 22a and 22b heat the medium 50 at preset temperatures so as to have the medium 50 stay at an initial temperature and avoid any impact of environmental temperature. The heating temperatures of the printing heaters 22a and 22b may be constant temperatures slightly higher than environmental temperature (for example, approximately 30 to 50° C.). The heating temperatures of the printing heaters 22a and 22b, therefore, may be relatively low temperatures substantially equal to room temperature. In this modified example, the ink is heated and thereby fixed to the medium 50 mostly by ultraviolet light radiated from the ultraviolet light sources 104. The printing heaters 22a and 22b, therefore, may possibly be unnecessary depending on an environment where the printing operation is carried out and/or a printing quality demanded. When the printing operation is carried out in a standard room with less changes in temperature, for example, the printing heaters 22a and 22b may be unnecessary.

The position detectors 34a and 34b are sensors for detecting positions of images printed on the medium 50. In this modified example, the position detectors 34a and 34b detect positions of predetermined marks drawn by the inkjet heads of the head portion 12a and 12b so as to detect positions of the images printed on the medium 50. Specifically, the head portions 12a and 12b print (record) marks indicating image reference positions, for example, register marks, when images or designed patterns are printed on the medium 50. The position detector 34a is a mark position detector that detects the position of the mark drawn by the head portion 12a on the front surface of the medium 50. The position detector 34a further detects the position of the image printed at the same time as the mark is drawn by the head portion 12a. The position detector 34b is a mark position detector that detects the position of the mark drawn by the head portion 12b on the back surface of the medium 50. The position detector 34b further detects the position of the image printed at the same time as the mark is drawn by the head portion 12b. In this manner, positions of the images printed on the front and back surfaces of the medium 50 may be accurately detected.

The position detector 34a is disposed at a position between the head portion 12a and the head portion 12b in the transport direction of the medium 50. The position detector 34b is disposed at a position more downstream than the head portion 12b in the transport direction of the medium 50. With these position detectors thus arranged, the position of the image printed on the front surface of the medium 50 may be detected before the head portion 12b starts to perform printing at positions on the medium 50. Then, the position of the image to be printed on the back surface of the medium 50 by the head portion 12b may be suitably adjusted based on information of the position detected by the position detector 34a. If necessary, inclination and/or size of an image to be printed may also be adjusted.

By having the position detector 34b detect the position of the image printed by the head portion 12b, the image position on the back surface may be detected as well. In this manner, a relationship between positions of the images printed on the front and back surfaces may be accurately determined. In case any misalignment and/or displacement is detected in the image printed on the back surface (for example, position, inclination, or size), positions of the ink droplets to be ejected from the inkjet heads, for example, may be adjusted based on the detected position. As a result, the image position may be easily and appropriately adjusted. Thus, duplex printing using the medium 50 may be more favorably performed.

The mark indicating the image reference position may be any suitable one but the register mark selected from variously-shaped marks, an example of which is a painted-out circle. The method of position detection using the position detectors 34a and 34b may be variously modified. For example, transmitted light or reflected light may be used to detect the positions. The marks indicating the reference positions are not necessarily printed by the head portions 12a and 12b in the printing operation. Instead, marks previously drawn on the medium 50 may be used. The position detectors 34a and 34b may be disposed more upstream than the corresponding head portions 12a and 12b in the transport direction of the medium 50 so as to detect target regions of image printing before the images are printed by the head portions 12a and 12b. In this instance, duplex printing using the medium 50 may be favorably performed by adjusting relevant positions in accordance with results of detection by the position detectors 34a and 34b before the images are printed by the head portions 12a and 12b.

The after-heating UV irradiators 36 and the after-heater 24 are both for use in after-heating treatment for the medium 50 (after-heating drying means). The after-heating UV irradiators 36 are respectively disposed on the front surface side and the back surface side of the medium 50 and radiate ultraviolet light toward the medium 50 for after-heating of the medium 50. The after-after-heater 24 are respectively disposed on the front surface side and the back surface side of the medium 50 and generates heat at preset temperatures for after-heating of the medium 50. Combined use of the after-heating UV irradiators 36 and the after-heater 24 may ensure that the ink on the medium 50 is fully dried and reliably fixed to the medium 50.

Such after-heating treatment may completely evaporate and remove a portion of the solvent that penetrated into the fabric of the medium 50 (residual solvent). Taking for instance ink containing a pigment and, for example, a binder resin, the resin may cause the pigment to firmly and stably adhere to the medium 50 after the solvent is fully evaporated. The after-heating UV irradiators 36 and the after-heater 24 may be unnecessary depending on features of ink used and/or a printing quality demanded. The after-heating treatment may be performed by the after-heater 24 alone without using the after-heating UV irradiators 36. Other examples of the after-heater may include infrared heaters, hot air heaters, and heat rollers.

In this modified example, inks ejected from the head portions 12a and 12b that just landed on the medium 50 may be irradiated with intense ultraviolet light from the ultraviolet light sources 104 moving with the inkjet heads 102 during main scans. The ultraviolet light directed toward the ink is converted into heat and rapidly heats the ink layer alone to temperatures substantially equal to or higher than the boiling point. Thus, the solvent in the ink is heated rapidly (fast). In this modified example, therefore, the risk of ink bleeding may be effectively reduced.

Such fast heating of the ink may adequately decrease heat loss through the medium 50. In this modified example, the ink alone may be heated to high temperatures only in a region that the inkjet heads 102 already passed, therefore, the inkjet heads 102 may be hardly heated by ultraviolet light. This may avoid the risk of clogged nozzles. Any one selected from solvents having high boiling points (water or organic solvent) may be used as the ink solvent, which may improve the safety and reliability of the printing apparatus 10. For example, ink containing an ultraviolet absorbent having transparency against light in the visible light range may be unlikely to become cloudy or lose color brightness. As a result, a clear print result may be obtained.

In this modified example, the ink droplets are irradiated with ultraviolet light immediately after landing on the fabric medium 50 and rapidly heated. Then, the ink solvent (for example, water) may be adequately dried before a large portion of the ink penetrates into the medium 50, and the ink layer may be formed at a high concentration near the surface of the medium 50. By drying the ink before penetrating into the medium 50, absorption of abundant ink into the fabric of the medium 50 may be controllable, which may prevent possible deformation of the medium 50.

In duplex printing, relative displacement between positions of the images printed on the front and back surfaces may be avoided by preventing such deformation of the medium 50. In this modified example, positions of the images are detected by the position detectors 34a and 34b for necessary adjustment of the positions, so that the images printed on the front and back surfaces are accurately and correctly positioned relative to each other. Therefore, high-quality duplex printing may be feasible with the fabric medium 50.

In case the medium 50 absorbing abundant ink is thereby significantly deformed and/or warped, accurate detection of the image positions by the position detectors 34a and 34b may be difficult to achieve. In this modified example, possible deformation of the medium 50 may be avoided by rapidly drying the ink, which may allow the image positions to be accurately detected by the position detectors 34a and 34b.

In this modified example characterized by fast drying means, duplex printing may be successfully performed with the permeable medium 50 (fabric medium 50) without subjecting the medium to any bleeding-preventive pretreatment. The risk of ink bleeding may be adequately suppressed against any increase of the ink landing on the medium 50 per unit area and per unit time. This modified example, therefore, may enable high-speed duplex printing using the permeable medium 50 without subjecting the medium to any pretreatment, for example, one-pass printing for each of positions on the front and back surfaces of the medium 50 may be feasible. When ink containing a pigment as colorant is used as described in this modified example, no special aftertreatment may be unnecessary.

Therefore, high-quality duplex printing may be feasible with the fabric medium 50 in this modified example, promising successful digital duplex printing for textiles that provides clear print results that excel in fastness. Specifically, various patterns may be printed on the front and back surfaces of the fabric medium 50 without misalignment of colors or ink bleeding. Therefore, digital inkjet printing may be applicable to luxury fabrics for clothes, scarves, handkerchiefs, curtains, and short curtains for store entrances that are often seen from both sides. The fabric medium 50 may be directly used for duplex printing without any pretreatment, which may lead to cost reduction and shorter delivery date.

The description given so far mostly discussed use of the ink containing a pigment as colorant. Instead, ink containing a dye as colorant may be used for duplex printing with the fabric medium 50. The printing apparatus 10 illustrated in FIGS. 5A and 5B may use various inks containing different dyes, as colorant, that develop colors with the aid of auxiliary agents. Use of dye-containing aqueous latex inks in the printing apparatus 10 of FIGS. 5A and 5B is hereinafter described in further detail. The printing apparatus 10 in this instance may be a textile printer adapted for high-resolution duplex printing.

Duplex printing using the medium 50 may double the amount of solvent absorbed into the medium 50, further increasing the risk of ink bleeding. There is even a higher risk of ink bleeding with thin materials used in, for example, summer clothes, scarves, and handkerchiefs. Further, the fabric medium 50 may be swollen by the absorbed solvent, which makes the medium 50 difficult to maintain precision in size. Thus, duplex printing using the known dye inks may be particularly difficult to perform when the fabric medium 50 is used.

The inventors of this disclosure found out through their studies that a favorable print result may be obtained in duplex printing using the fabric medium 50 subjected to no bleeding-preventive pretreatment without compromising the surface glossiness of a printed matter when the ultraviolet-absorbable aqueous latex ink containing a dye as colorant is used and rapidly dried under ultraviolet irradiation at a temperature low enough not to boil the ink. The ultraviolet-absorbable aqueous latex ink may be thus suitably used for fast drying means under ultraviolet irradiation. This may be rephrased that such ink is usable that can be prevented from bleeding and fixed to the medium by rapidly drying the solvent under ultraviolet irradiation. Additionally, the printing apparatus 10 of FIGS. 5A and 5B may enable direct printing for both surfaces of the medium 50.

Such ink may contain an ultraviolet absorbent, a resin, an aqueous solvent that emulsifies or suspends the aqueous solvent, and a dye. The dye is a colorant added to the ink. Examples of the dye may include various dyes used to dye natural fibers and chemical fibers. Specific examples of the dye may include acid dyes, reactive dyes, disperse dyes, direct dyes, alloy dyes, indanthrene dyes, vegetable-derived dyes, and chemical indigo dyes. Other example of the dye may include aqueous latex dyes for textile printing.

When a dye is used as colorant, an auxiliary agent for color development may be additionally used, if necessary. Examples of the auxiliary agent may include auxiliary agents to prevent uneven dyeing, auxiliary agents for level dyeing, auxiliary agents for color fixation, and auxiliaries to accelerate dye absorption. Other possible examples of the auxiliary agent may include alkali agents for reactive dyes that accelerate color reactions, reducing agents for vat dyes, and acid auxiliaries for acid dyes. The auxiliary agent may be added to the ink with a dye. For example, an inkjet head may be further provided for exclusive use of auxiliary agent-containing ink, from which the auxiliary-containing ink may be ejected to the same position as the dye-containing ink.

When a dye is used as colorant, an aftertreatment may be additionally performed for color development, if necessary. When such a dye is used that needs to be steamed or heated at high temperature, like reactive dyes and acid dyes, the dye is additionally subjected to aftertreatment using an oven or steamer for full color development. When a dye and an auxiliary agent are used, the aftertreatment may be washing the fabric medium 50 with water or a cleaning liquid so as to remove any residual of the auxiliary agent or an unreacted portion of the dye. In this instance, the washed medium 50 may desirably be dried. If necessary, the medium 50 may be ironed or softened with a softening agent.

As described thus far, the aqueous latex ink containing a dye as colorant dried by being irradiated with ultraviolet light under appropriate conditions may be instantaneously stopped from bleeding without comprising the surface glossiness of a printed matter. Then, clear images or patterns that excel in fastness to wash may be printed at high color concentrations on both surfaces of the fabric medium 50 without any pretreatment.

So far was mostly described the printing operation of the printing apparatus 10 illustrated in FIGS. 5A and 5B for duplex printing using the fabric medium 50. A printing apparatus 10 differently configured may be used for duplex printing using the medium 50.

Figure 6:
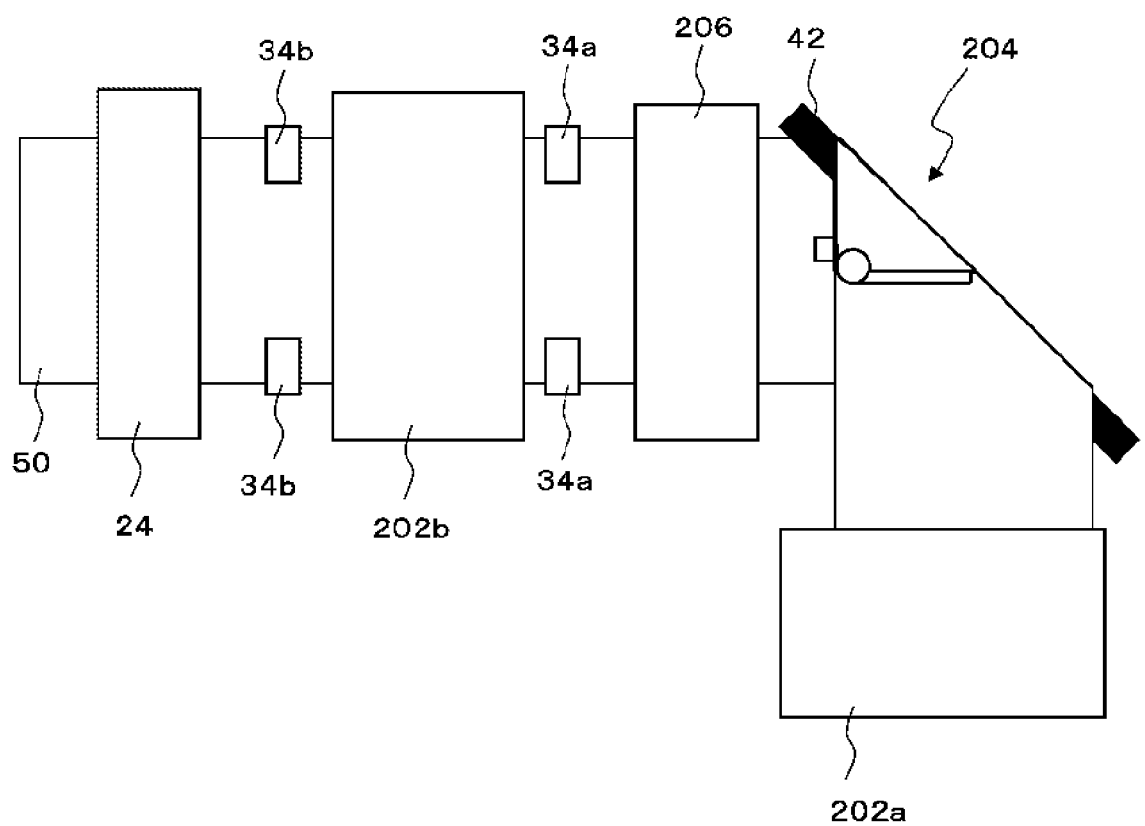
FIG. 6 is a drawing that illustrates another modified example of the printing apparatus 10.

FIG. 6 is a drawing that illustrates another modified example of the printing apparatus 10 adapted for duplex printing using the fabric medium 50. Except for the additional features described below, the structural elements illustrated in FIG. 6 with the same reference signs as FIGS. 1A to 5B may be identical or similar to the ones illustrated in FIGS. 1A to 5B.

In this modified example, the printing apparatus 10 performs duplex printing using the medium 50 and ultraviolet-absorbable aqueous latex ink identical or similar to the one used in the printing apparatus 10 of FIGS. 5A and 5B. The printing apparatus 10 includes a plurality of printing portions 202a and 202b, a reversing member 204, a tension controller 206, a plurality of position detectors 34a and 34b, and an after-heater 24.

The printing portions 202a and 202b are in charge of ejecting ink droplets to the medium 50 and irradiating the ejected ink droplets with ultraviolet light. The printing portions 202a and 202b each have a head portion similar or identical to the head portion 12 illustrated in FIGS. 5A and 5B, and a driving portion that drives the head portion to perform main and sub scans. Therefore, the printing portion 202a, 202b may be functionally equivalent to an independent inkjet printer. The printing apparatus 10 may accordingly constitute a printing system equipped with functions of two inkjet printers.

In this modified example, two printing portions 202a and 202b are arranged in series along the transport direction of the medium 50 and perform printing operations for the medium 50 at predetermined positions. The printing portion 202a prints an image or pattern on one of surfaces, front surface, of the medium 50 (front-surface printing). The printing portion 202b prints an image or pattern on the other surface, back surface, of the medium 50 (back-surface printing). In this modified example, the medium 50 is reversed with the reversing member 204 at a position between the printing portions 202a and 202b. In the printing apparatus 10, the printing portions 202a and 202b are positioned so that ink droplets are ejected from these printing portions in the same direction. In the printing apparatus 10, a first printer of the printing portions 202a and 202b equivalent to two inkjet printers arranged in series, the printing portion 202a, prints an image or pattern on the front surface of the medium 50, and a second inkjet printer, the printing portion 202b, prints an image or pattern on the back surface of the medium 50. The printing portion 202a may be a printer exclusive for front-surface printing. The printing portion 202b may be a printer exclusive for back-surface printing.

The reversing member 204 reverses the medium 50 at an intermediate position on the transport path of the medium 50. In this modified example, the reversing member 204 has a reversing roller 42. The medium 50 is rolled over along the reversing roller 42 so that front and back surfaces of the medium 50 are turned upside down, with the transport direction of the medium 50 being changed between the printing portions 202a and 202b. The reversing member 204 orthogonally changes the transport direction of the medium 50, as illustrated in the drawing. In the printing apparatus 10 of this modified example, the printing portions 202a and 202b may be disposed on the transport path bending at a right angle so that the bent part is interposed between these printing portions (right-angled continuous duplex printing).

The tension controller 206 adjusts the tension of the medium 50 being transported. In this modified example, the tension controller 206 is disposed between the reversing member 204 and the printing portion 202b. The tension controller 206 thus positioned adjusts the tension of the medium 50 that has been reversed with the reversing member 204 before the printing operation of the printing portion 202b starts.

The position detectors 34a and 34b detect positions of images printed on the medium 50 by the printing portions 202a and 202b. By using the position detectors 34a and 34b, the image positions on the front and back surfaces of the medium 50 may be appropriately adjusted in the same manner as or in a manner similar to the printing apparatus 10 illustrated in FIGS. 5A and 5B. In this modified example, the position detectors 34a and 34b detect marks printed on the medium 50, as well as images printed thereon, so as to detect the image positions in the same manner as or in a manner similar to the position detectors 34a and 34b of the printing apparatus 10 illustrated in FIGS. 5A and 5B. The position detector 34a detects the mark printed by the printing portion 202a on the front surface of the medium 50. The position detector 34a may be defined as a front surface mark position detector. The position detector 34a further detects the position of the image printed by the printing portion 202a based on the position of the detected mark. In this regard, the position detector 34a may be defined as a means for detection control of front image position. The position detector 34b detects the mark printed by the printing portion 202b on the back surface of the medium 50. The position detector 34b further detects the position of the image printed by the printing portion 202b based on the position of the detected mark. In this regard, the position detector 34b may be defined as a back surface mark position detector or a means for detection control of back image position. The after-heater 24 is for use in after-heating treatment for the medium 50.

In this modified example, the ink may be rapidly dried under ultraviolet irradiation not to boil and thereby prevented from bleeding without compromising the surface glossiness of a printed matter. Further, duplex printing using the fabric medium 50 subjected to no bleeding-preventive pretreatment may be successfully performed.

In the example illustrated in FIG. 6, the medium 50 is reversed with the reversing member 204. In a modified example of duplex printing means, any other suitable means may be employed to reverse the medium 50.

Figure 7A:
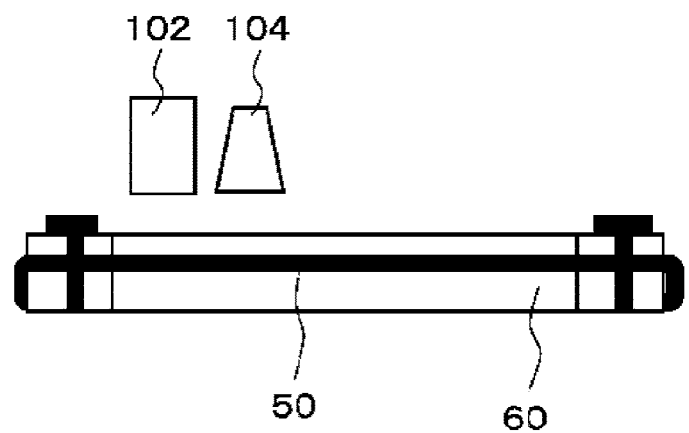
FIGS. 7A to 7C are drawings that illustrate modified examples of duplex printing.
Figure 7B:
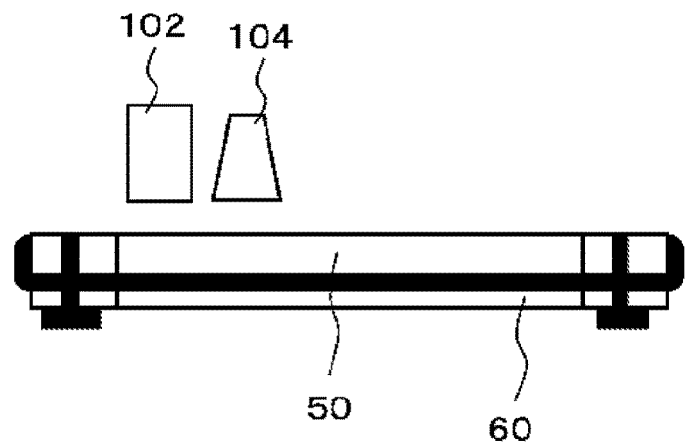
Figure 7C:
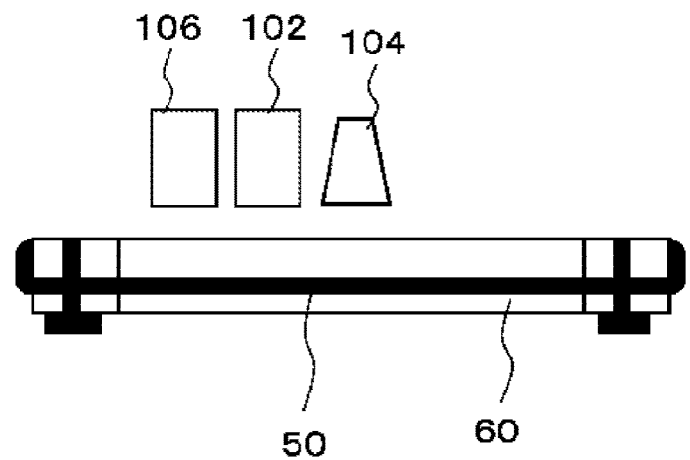

FIGS. 7A to 7C are drawings of a modified example of the duplex printing means, illustrating a printing operation in case the medium 50 is reversed with a jig 60. FIG. 7A is a drawing of an exemplified printing operation for one of surfaces (front surface) of the medium 50. FIG. 7B is a drawing of an exemplified printing operation for the other surface (back surface) of the medium 50. FIG. 7C is another modified example of the printing operation using the medium 50. Except for the additional features described below, the structural elements illustrated in FIGS. 7A to 7C with the same reference signs as FIGS. 1A to 6 may be identical or similar to the ones illustrated in FIGS. 1A to 6. While FIGS. 7A to 7C illustrate an inkjet head 102 and an ultraviolet light source 104 alone among the structural elements of the printing apparatus used, the printing apparatus may use any other means required to print an image/pattern on the medium 50.

In the printing operation of this modified example, the printing apparatus is configured to move the inkjet head 102 for sub scans, instead of transporting the medium 50. A suitable example of the printing apparatus thus configured may be a flatbed inkjet printer. The printing apparatus in this instance is an inkjet printer that carries out the printing operation for one surface alone of the medium 50 in one printing cycle. In this modified example, color inks used are each an ultraviolet-absorbable aqueous latex ink containing an ultraviolet absorbent and rapidly dried under ultraviolet irradiation. This printing apparatus includes the inkjet heads 102 that eject droplets of the ink, and ultraviolet light source 104 that irradiates the ink that landed on the medium with ultraviolet light.

In this instance, the printing operation for the medium 50 starts after a tool that holds the medium 50 (printing tool) 60 is set on the flatbed. A suitable example of the tool 60 may be adjustable in position on the flatbed. In this modified example, the tool 60 may be allowed to retain the fabric medium 50 in a tightly stretched state. The tool 60 may be the same as or similar to a tool that holds a printing-target fabric in silk-screen printing (frame for holding a silk screen).

To start duplex printing, the fabric medium 50 is tacked across the tool 60. Then, the tool 60 is set at a position in the printing apparatus 10. The tool 60 is set so that a printing-target surface of the medium 50 faces the inkjet head 102 and the ultraviolet light source 104.

Before an image is printed on the front surface of the medium 50, the tool 60 is set so that the front surface of the medium 50 faces the inkjet heads 102, as illustrated in FIG. 7A. Then, the image to be printed (color image) is printed by the inkjet head 102 on the front surface of the medium 50. In this modified example, a mark indicating the reference position of the image, such as a pattern, is also printed in addition to the image, such as a designed pattern, printed on the medium 50 (mark for position detection). Immediately after the ink droplets landed on the medium 50, the ink is irradiated with ultraviolet light from the ultraviolet light source 104 and thereby dried without being boiled. As a result, the image may be successfully printed on the front surface of the medium 50.

After the image is printed on the front surface, the tool 60 holding the medium 50 is reversed so as to reverse the medium 50 on the flatbed, and the tool 60 is set so that the back surface of the medium 50 faces the inkjet head 102, as illustrated in FIG. 7B. In this modified example, a mark indicating the reference position of an image, such as a pattern, alone is printed on the back surface before the image is printed thereon. Immediately after the ink droplets landed on the medium 50, the ink is irradiated with ultraviolet light from the ultraviolet light source 104 and thereby dried. Then, positions of the marks printed on the front and back surfaces of the medium 50 are detected by position detectors not illustrated in the drawings. Further, any displacement along in-plane directions (main and sub scanning directions), for example, is calculated based on the detected positions. Then, an image printing position on the back surface is corrected, if necessary. At the time, the image may be changed or corrected in size.

After any necessary position adjustment and/or size correction, the image is printed by the inkjet head 102 on the back surface of the medium 50. Immediately after the ink droplets landed on the medium 50, the ink is irradiated with ultraviolet light from the ultraviolet light source 104 and thereby dried. As a result, the image may be successfully printed on the back surface of the medium 50.

By thus drying the ink in short time without boiling the ink, high-speed duplex printing may be performed at high concentrations, with reduced risks of ink bleeding and loss of surface glossiness. By using the tool 60 in the printing operation, cost reduction and shorter delivery date may be achieved with fabric products conventionally produced by the silk-screen printing. According to this modified example, duplex printing may be applied to production of various two-dimensional fashion items, such as scarves and handkerchiefs.

When inks containing dyes as colorant are used in this modified example, treatments may be additionally applied, if necessary, for example, heating or steaming the medium 50 for color development and fixation of dye and/or washing the medium 50 with water. For example, the fabric medium 50 may be coated with a pretreatment agent in the printing operation. In this instance, an inkjet head 106 for pretreatment may be further used to eject droplets of pretreatment agent-containing ink, as illustrated in FIG. 7C. When, for example, ink that requires pretreatment for the medium 50 is used in the inkjet heads 102 (for example, water-soluble dye ink likely to bleed), the inkjet head 106 may desirably be used to coat the medium 50 with a pretreatment agent beforehand, if necessary. Another modified example may further use an inkjet head that ejects droplets of ink containing an auxiliary agent for dye used as colorant.

Hereinafter, additional remarks are given in relation to the technical aspects described thus far. So far were described means and operations to print color images using YMCK four color inks. The basic color inks for color expression may include other inks in addition to the YMCK color inks. For example, the YMCK four color inks and the RGB color inks, which are seven color inks in total, may be at least used for color expression This may allow a diverse range of colors to be expressed with reduced amounts of inks and further allow each color to be expressed more vividly. Therefore, these seven color inks may desirably be used to express diverse colors in duplex printing using the fabric medium 50.

When these seven color inks are used, inkjet heads for each RGB colors may be disposed adjacent to the inkjet heads for each YMCK colors in the main scanning direction (Y direction). The inkjet heads for each RGB colors may be displaced from the inkjet heads for each YMCK colors in the sub scanning direction (X direction) In these instances, the ultraviolet light sources may be disposed in accordance with positions of the inkjet heads. The positions of the ultraviolet light sources in the sub scanning direction may be displaced from positions of the inkjet heads in a direction in which ultraviolet light is radiated for the ejected ink droplets (behind the inkjet heads).

In addition to the inkjet heads for the basic colors including the YMCK or YMCKRGB colors, inkjet heads for colors other than these colors may be additionally used, for example, inkjet heads for feature colors such as orange, white, yellowish green, indigo, and/or metallic (silver) colors.

The ultraviolet light radiated toward ink that just landed on the medium 50 may have a wavelength, for example, between approximately 250 nm and 400 nm in accordance with an intense absorption wave range for the ultraviolet absorbent. In this case, the irradiation intensity of ultraviolet light is preferably, for example, approximately greater than or equal to 0.5 W/cm$^2$, and desirably approximately greater than or equal to 1 W/cm$^2$ on the medium 50. Such ultraviolet irradiation intensity may allow the ink to be dried in short time.

The ultraviolet irradiation energy required to dry the ink may be approximately 0.05 to 5 Joule/cm$^2$. Therefore, the ultraviolet irradiation energy may be set, for example, to approximately 0.05 to 5 Joule/cm$^2$, and preferably be approximately 0.5 to 2 Joule/cm$^2$. The magnitude of ultraviolet irradiation energy required to dry the ink may increase with higher boiling points of the ink solvent. As the ultraviolet irradiation intensity is weaker and the irradiation time is correspondingly longer, more thermal energy is lost through the medium 50, which requires greater ultraviolet irradiation energy. The intensity and energy of ultraviolet irradiation toward the medium 50 may be optimally set in view of these factors.

When the fabric medium 50 is a print target medium and required to have fastness to wash and flexibility, the resin included in the aqueous latex ink may provide a favorable effect. Examples of the resin may include urethane resins, epoxy resins, and urethane-epoxy mixed resins.

WORKING EXAMPLES

Example 1

Tables 1 and 2 show compositions of ultraviolet absorbent-containing inks. The materials shown in these tables were mixed and stirred with a stirrer for approximately three hours to prepare a cyan ink and a magenta ink.

TABLE 1

| | Ingredients | Wt. % |
|---|---|---|
| Composition of cyan ink | Pigment-dispersed liquid, cyan | 12 |
| | Resin | 20 |
| | Diethylene glycol monobutyl ether | 20 |
| | 1,2-butanediol | 30 |
| | Surfactant | 0.5 |
| | Ultraviolet absorbent | 1 |
| | Water | Remainder |

TABLE 2

| | Ingredients | Wt. % |
|---|---|---|
| Composition of magenta ink | Pigment-dispersed liquid, magenta | 18 |
| | Resin | 20 |
| | Diethylene glycol monobutyl ether | 20 |
| | 1,2-butanediol | 30 |
| | Surfactant | 0.5 |
| | Ultraviolet absorbent | 1 |
| | Water | Remainder |

The pigment dispersing liquids for the cyan ink and the magenta ink shown in Tables 1 and 2 were respectively FUJI SP BLUE 6559 (Fuji Pigment Co., Ltd.) and FUJI SP MAGENTA 9430 (Fuji Pigment Co., Ltd.). The resin used for both of the inks was SUPERFLEX 126 (DKS Co., Ltd.). The surfactant used for both of the inks was BYK-349, silicon-based surfactant (BYK Japan KK). The ultraviolet absorbent used for both of the inks was EVERSORBBL 371, benzophenone-based ultraviolet absorbent (Everlight Chemical Industrial Co.).

Comparative Example 1 Preparation of Ink Containing No Ultraviolet Absorbent

In steps similar to the example 1, cyan and magenta inks were prepared that had the same compositions as in the example 1, except that no ultraviolet absorbent was used in the composition shown Tables 1 and 2.

Example 2 Verification of Heat Generation by Ultraviolet Irradiation (Test 1)

The cyan ink prepared in the example 1 was collected in the amount of 10 g and put on a laboratory dish, and then irradiated for one minute with ultraviolet light radiated from an ultraviolet LED lamp. The ultraviolet light had the luminous intensity of 1150 mW/cm$^2$ and the wavelength of 385 nm. A thermograph was used to measure temperatures on the ink surface, and a highest temperature reachable on the ink surface was recorded.

The cyan ink prepared in the comparative example 1 was tested in the same manner. Table 3 shows the obtained result.

Example 3 Measurement of Surface Properties and Ink Bleeding Width of Printed Matter (Test 2)

By using a printer (CJV-150, MIMAKI ENGINEERING CO., LTD.) filled with the cyan ink and the magenta ink prepared in the example 1, inkjet printing was performed, in which the inks were ejected so as to land next to each other on a medium made of polyvinyl chloride (PWS-G, MIMAKI ENGINEERING CO., LTD.) at the concentration of 100%. The inks were then irradiated with ultraviolet light and dried with a pre-heater, a printing heater, and an after-heater set to a platen temperature 55° C. Ultraviolet LED lamps were attached to both sides of the inkjet heads of the printer and set to start to radiate ultraviolet light having the luminous intensity of 1150 mW/cm$^2$ and the wavelength of 385 nm in approximately 0.7 seconds after the inks were ejected to the polyvinyl chloride medium from the inkjet heads and cease to radiate ultraviolet light approximately 0.1 seconds later. The surface properties of the obtained printed matter were evaluated with naked eye, and the ink bleeding width between the cyan and magenta inks on the printed matter was measured with an optical microscope. The criterion for evaluation of the surface properties was whether the surface of the printed matter was matte and lost glossiness. The cyan and magenta inks prepared in the comparative example 1 were ejected and dried under the same conditions, and the surface properties of the obtained printed matter were evaluated with naked eye, and the ink bleeding width was measured with an optical microscope. Table 3 shows the obtained result.

TABLE 3

| | Target of evaluation | Example 1 | Comparative example 1 |
|---|---|---|---|
| Test 1 | Ink Surface temperature | 74° C. | 64° C. |

TABLE 3-continued

|  | Target of evaluation | Example 1 | Comparative example 1 |
|---|---|---|---|
| Test 2 | Surface properties of printed matter | Not matte | Not matte |
|  | Ink bleeding width of printed matter | 130 μm | 182 μm |

As is clear from the result, this disclosure, by heating the surfaces of the prepared inks adhered to the recording medium to a temperature low enough not to boil and rapidly dry the inks, may successfully suppress the risk of ink bleeding without adversely affecting the surface properties of these inks.

INDUSTRIAL APPLICABILITY

The technology disclosed herein may be suitably applicable to printing apparatuses.

What is claimed is:

1. A printing method for performing an inkjet printing using a medium, the printing method comprising:
    ejecting an ink to the medium from an inkjet head while moving the inkjet head relatively in a main scanning direction and adhering the ink to the medium, the ink including a colorant, an ultraviolet absorbent, a resin, and an aqueous solvent that emulsifies or suspends the resin; and
    irradiating the ink adhered to the medium with an ultraviolet light using an ultraviolet light source to heat the ink to a temperature lower than a boiling point of the ink and high enough to prevent the ink from bleeding, so that the aqueous solvent is at least in part volatilized and removed from the ink,
        wherein the ink does not substantially include a material that is cured by a polymerization reaction by the ultraviolet light,
        wherein the ultraviolet light source is disposed at a position adjacent to the inkjet head in the main scanning direction, and the ultraviolet light source immediately irradiates the ultraviolet light after the ink has landed on the medium while the inkjet head relatively moves in the main scanning direction so that the ultraviolet light is selectively absorbed by the ink that already landed on the medium, and the ink itself generates a heat, and the heat is utilized to volatilize and remove the aqueous solvent.

2. The printing method according to claim 1, wherein the aqueous solvent includes water and a water-soluble organic solvent, and
    the ink adhered to the medium is irradiated with the ultraviolet light from the ultraviolet light source and heated to a temperature lower than 100° C.

3. The printing method according to claim 1, wherein the ink includes the ultraviolet absorbent in a content greater than or equal to 0.01 wt. % and less than or equal to 5.0 wt. %.

4. The printing method according to claim 2, wherein the ink includes the ultraviolet absorbent in a content greater than or equal to 0.01 wt. % and less than or equal to 5.0 wt. %.

5. The printing method according to claim 1, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

6. The printing method according to claim 2, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

7. The printing method according to claim 3, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

8. A printing apparatus that performs an inkjet printing using a medium, the printing apparatus comprising:
    an inkjet head that ejects droplets of an ink using the inkjet printing; and
    an ultraviolet light source that irradiates an ultraviolet light,
    wherein the inkjet head ejects the droplets while relatively moves in a main scanning direction so as to adhere the ink to the medium, and the ink includes a colorant, an ultraviolet absorbent, a resin, and an aqueous solvent that emulsifies or suspends the resin, and the ink does not substantially include a material that is cured by a polymerization reaction by the ultraviolet light;
    wherein the ultraviolet light source irradiates the ink adhered to the medium with the ultraviolet light to heat the ink to a temperature lower than a boiling point of the ink and high enough to prevent the ink from bleeding, so that the aqueous solvent is at least in part volatilized and removed from the ink,
    wherein the ultraviolet light source is disposed at a position adjacent to the inkjet head in the main scanning direction, and the ultraviolet light source immediately irradiates the ultraviolet light after the ink has landed on the medium while the inkjet head relatively moves in the main scanning direction, so that the ultraviolet light is selectively absorbed by the ink that already landed on the medium, and the ink itself generates a heat, and the heat is utilized to volatilize and remove the aqueous solvent.

9. The printing apparatus according to claim 8, wherein the aqueous solvent includes water and a water-soluble organic solvent, and
    the ink adhered to the medium is irradiated with the ultraviolet light from the ultraviolet light source and heated to a temperature lower than 100° C.

10. The printing apparatus according to claim 8, wherein the ink includes the ultraviolet absorbent in a content greater than or equal to 0.01 wt. % and less than or equal to 5.0 wt. %.

11. The printing apparatus according to claim 9, wherein the ink includes the ultraviolet absorbent in a content greater than or equal to 0.01 wt. % and less than or equal to 5.0 wt. %.

12. The printing apparatus according to claim 8, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

13. The printing apparatus according to claim 9, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

14. The printing apparatus according to claim 10, wherein the ultraviolet absorbent is one or more selected from benzotriazole-based ultraviolet absorbents, liquid ultraviolet absorbents, triazine-based ultraviolet absorbents, benzophenone-based ultraviolet absorbents, and benzoate-based ultraviolet absorbents.

* * * * *